(12) United States Patent
Litovsky et al.

(10) Patent No.: US 7,245,185 B2
(45) Date of Patent: Jul. 17, 2007

(54) CONTROLLING A POWER CONVERTER

(75) Inventors: Roman Litovsky, Newton, MA (US); William R. Short, Southboro, MA (US)

(73) Assignee: Bose Corporation, Framingham, MA (US)

( * ) Notice: Subject to any disclaimer, the term of this patent is extended or adjusted under 35 U.S.C. 154(b) by 377 days.

(21) Appl. No.: 10/872,040

(22) Filed: Jun. 18, 2004

(65) Prior Publication Data

US 2005/0280312 A1    Dec. 22, 2005

(51) Int. Cl.
*H03F 3/04* (2006.01)
(52) U.S. Cl. ..................................... 330/297
(58) Field of Classification Search ............... 330/285, 330/297
See application file for complete search history.

(56) References Cited

U.S. PATENT DOCUMENTS

| | | | |
|---|---|---|---|
| 6,104,759 A | 8/2000 | Carkner et al. | 375/295 |
| 6,608,900 B1 | 8/2003 | Yancey et al. | 379/413 |
| 6,628,107 B1 | 9/2003 | Bang et al. | 323/266 |
| 6,653,814 B1 | 11/2003 | Patino | 320/103 |
| 6,664,766 B2 | 12/2003 | Desprez et al. | 320/167 |
| 6,949,915 B2 * | 9/2005 | Stanley | 323/207 |

FOREIGN PATENT DOCUMENTS

| | | |
|---|---|---|
| EP | 0 657 985 | 6/1995 |
| EP | 0 902 547 A2 | 3/1999 |
| EP | 1 202 427 | 5/2002 |
| FR | 2 847 741 | 5/2004 |
| WO | 02/074387 A2 | 9/2002 |

OTHER PUBLICATIONS

Linear Technology document for part LTC3459.
Linear Technology document for part LTC1624.
CAP-XX Pty Ltd White Paper, Use of Super capacitors to Improve Performance of GPRS Mobile Stations, Feb. 2003. pp. 1-77.

* cited by examiner

*Primary Examiner*—Steven J. Mottola
(74) *Attorney, Agent, or Firm*—Fish & Richardson P.C.

(57) ABSTRACT

In response to a change in a circuit parameter of a converter delivering power to a load, the converter is operated in a mode in which additional power is supplied to the load by a capacitive element that is in parallel with the converter, the circuit parameter including a parameter other than input current.

31 Claims, 20 Drawing Sheets

CONTROLLING A POWER CONVERTER

BACKGROUND

This description relates to controlling a power converter.

Power converters are used to supply power to a load. Some power converters are DC-DC converters supplying direct current (DC) power from a DC source such as a battery. Other power converters are AC-DC converters supplying DC power from an alternating current (AC) source such as a wall outlet. In some cases a capacitor in parallel with the power converter (e.g., a "super capacitor") is used as a back-up source.

SUMMARY

In general, in one aspect, the invention features a method that includes, in response to a change in a circuit parameter of a converter delivering power to a load, operating the converter in a mode in which additional power is supplied to the load by a capacitive element that is in parallel with the converter, the circuit parameter including a parameter other than input current.

Implementations of the invention may include one or more of the following features. The circuit parameter includes at least one of output current, input power, or temperature of a component of the converter. The load has a varying input impedance. The converter acts as a voltage source in a first mode and as a current source in a second mode. The converter includes a switching power supply.

In general, in one aspect, the invention features a method that includes, in response to a trigger condition caused by a change in a circuit parameter of a converter delivering power to a load, operating the converter in a mode in which additional power is supplied to the load by a capacitive element that is in parallel with the converter, the trigger condition being programmable.

Implementations of the invention may include one or more of the following features. The trigger condition is programmed into a microprocessor. The circuit parameter that causes the trigger condition is programmable. An amount by which the circuit parameter changes to cause the trigger condition is programmable. The load has a varying input impedance. The circuit parameter includes at least one of output current, input current, input power, or temperature of a component of the converter. The converter acts as a voltage source in a first mode and as a current source in a second mode. The converter includes a switching power supply.

In general, in one aspect, the invention features a method that includes, in response to a change in a circuit parameter of a converter delivering power to an amplifier, operating the converter in a mode in which additional power is supplied to an amplifier by a capacitive element that is in parallel with the converter, the gain of the amplifier being a function of a parameter indicative of an amplified signal level.

Implementations of the invention may include one or more of the following features. The gain of the amplifier is a function of a voltage supplied to the amplifier by the converter. The amplifier is capable of operating without clipping over a range of values of the voltage. The amplifier includes a compressor that has a threshold that is proportional to the voltage. The gain of the amplifier is proportional to the voltage over at least a portion of a range of possible values of the voltage. The circuit parameter includes at least one of output current, input current, input power, or temperature of a component of the converter. The converter acts as a voltage source in a first mode and as a current source in a second mode. The converter includes a switching power supply.

In general, in one aspect, the invention features a method that includes operating a converter delivering power to a load so that the current-voltage characteristic of the converter has a knee at a predefined current value, such that a reduction of the input impedance of the load causes an increase in a time constant for supplying additional power to the load by a capacitive element that is in parallel with the converter.

Implementations of the invention may include one or more of the following features. The current-voltage characteristic has an approximately flat voltage value over a range of current values below the predefined current value, and a lower voltage above the predefined current value. The current-voltage characteristic has a shallow slope for current values below the predefined current value and a steep slope for current values above a second predefined current value that is above the predefined current value. A current value of the current-voltage characteristic above the predefined current value is limited to a maximum current value. A reduction of the input impedance of the load causes the time constant to increase to a value between 1 and 10 seconds. The converter includes a switching power supply.

In general, in one aspect, the invention features an apparatus for delivering power to a load. The apparatus includes a capacitive element, and a converter in parallel with the capacitive element to, in response to a change in a circuit parameter of the converter, operate in a mode in which additional power is supplied to the load by the capacitive element, the circuit parameter including a parameter other than input current.

In general, in one aspect, the invention features an apparatus for delivering power to a load. The apparatus includes a capacitive element, and a converter in parallel with the capacitive element to, in response to a trigger condition caused by a change in a circuit parameter of the converter, operate in a mode in which additional power is supplied to the load by the capacitive element, wherein the trigger condition is programmable.

In general, in one aspect, the invention features an apparatus that includes a capacitive element, an amplifier in parallel with the capacitive element, and a converter in parallel with the capacitive element and the amplifier to, in response to a change in a circuit parameter of the converter, operate in a mode in which power is supplied to the amplifier by the capacitive element, wherein the gain of the amplifier is a function of a parameter indicative of an amplified signal level.

In general, in one aspect, the invention features an apparatus for delivering power to a load. The apparatus includes a capacitive element, and a converter in parallel with the capacitive element to operate so that the current-voltage characteristic of the converter has a knee at a predefined current value, such that a reduction of the input impedance of the load causes an increase in a time constant for supplying additional power to the load by the capacitive element.

Among the advantages of the invention are one or more of the following. Controlling a power converter to cause power to be supplied to a load by a capacitor enables high peak power to be supplied to the load. When a power converter supplies power from a battery, controlling current-voltage characteristics of the power converter by sensing converter input current from the battery increases battery life and reliability. Controlling current-voltage characteristics of a power converter by sensing converter output current prevents overload of the converter output components.

Other features and advantages of the invention will become apparent from the following description, and from the claims.

DESCRIPTION

Figure 1:
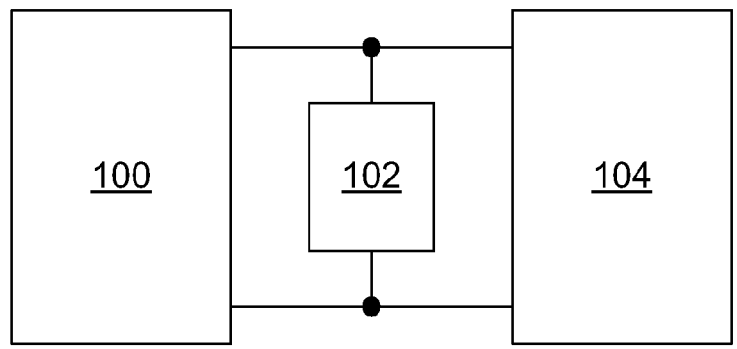
FIG. 1 is a circuit diagram of a power converter in parallel with a capacitive element coupled to a load.

FIG. 1 shows a circuit that includes a power converter 100 in parallel with a capacitive element 102 (e.g., circuitry having an impedance with negative reactance). The power converter 100 and capacitive element 102 are coupled to a load 104 that demands an amount of power $P_L$ based on the input resistance $R_L$ of the load 104. For a load 104 having a variable demand for power (a "variable load"), the input resistance $R_L(t)$ varies as a function of time t. For a power converter 100 that supplies a constant voltage $V_S$, the power $P_L(t)$ supplied to the load 104 is determined by $P_L(t)=V_S^2/R_L(t)$. In steady-state conditions (e.g., $R_L(t)$ is slowly varying with respect to the effective time constant associated with the capacitive element 102), the load 104 draws a current $I_L(t)$ from the power converter 100 that is approximately $I_L(t)=V_S/R_L(t)$.

Some variable loads (e.g., an audio power amplifier or a motor) have a peak power demand that is many times higher than the average power demand. In such cases, a power converter 100 with a controlled current-voltage characteristic, as described in more detail below, is able to supply the average power demanded by the load, while causing a brief demand for a high peak power to be supplied from energy stored in the capacitive element 102. By causing at least some of the peak power to be supplied from the capacitive element 102, the power converter 100 can maintain a relatively low amount of power drawn from a power source such as a battery or AC mains.

Figure 2A:
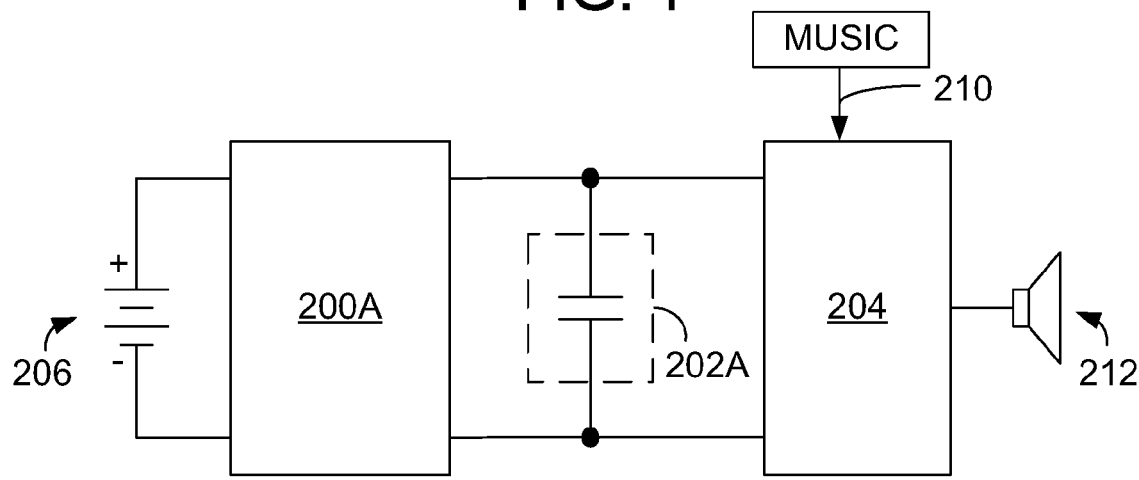
FIG. 2A is a circuit diagram of a DC-DC power converter in parallel with a capacitive element coupled to an audio amplifier.
Figure 2B:
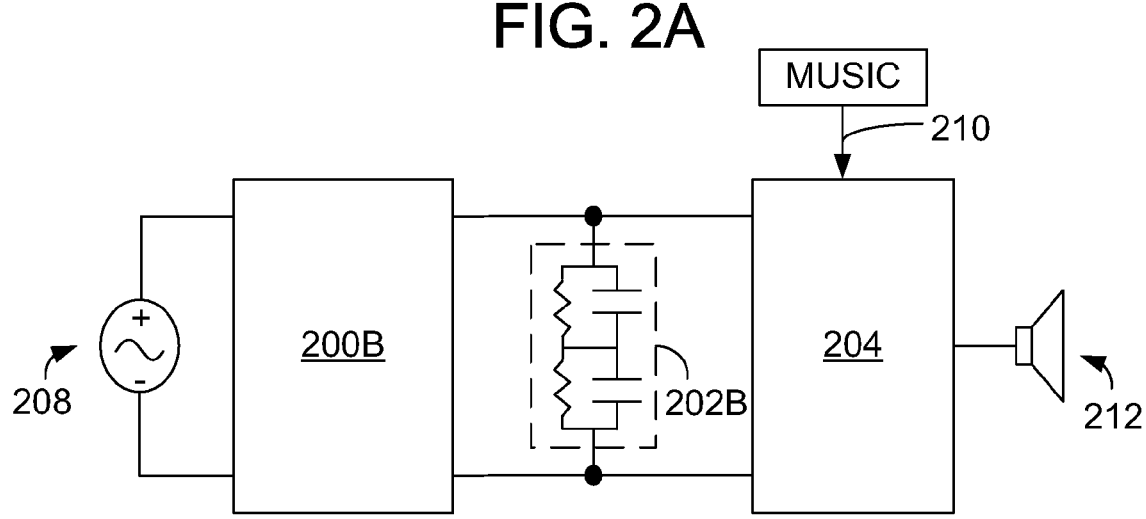
FIG. 2B is a circuit diagram of an AC-DC power converter in parallel with a capacitive element coupled to an audio amplifier.

As shown in FIGS. 2A and 2B, a DC-DC power converter 200A in parallel with a capacitive element 202A can be used to supply power to an audio amplifier 204 from a battery 206 (FIG. 2A), and an AC-DC power converter 200B in parallel with a capacitive element 202B can be used to supply power to the audio amplifier 204 from an AC mains 208 (FIG. 2B). The varying nature of the power demand from the audio amplifier 204 is determined, for example, by a music signal 210 that is amplified to drive a speaker 212. A power converter and capacitive element can be used to supply power to other types of devices or combinations of devices where power demand may vary (e.g., a charging cradle for a cell phone, where the cradle also acts as a powered loudspeaker and many other examples).

The capacitive element 202A can be implemented using a "super capacitor" or "ultra capacitor" (e.g., using aerogel technology) to obtain a capacitance in the range of approximately 1–30 Farads (F) and a maximum voltage of approximately 2.5 V. In another implementation, the capacitive element 202B includes two 10 F/2.5 V capacitors in series, each capacitor having a 5.1 kΩ shunt resistor (e.g., to provide even steady-state charge storage among the capacitors). The resulting capacitance of the capacitive element 202B is 5 F, and the maximum voltage of the capacitive element 202B is 5 V. In other implementations the capacitive element can include three or more capacitors connected in series. Any of a variety of implementations of a capacitive element including 202A, 202B or others may be used in any of a variety of power converter configurations including a DC-DC power converter, an AC-DC power converter or others.

Figure 3A:
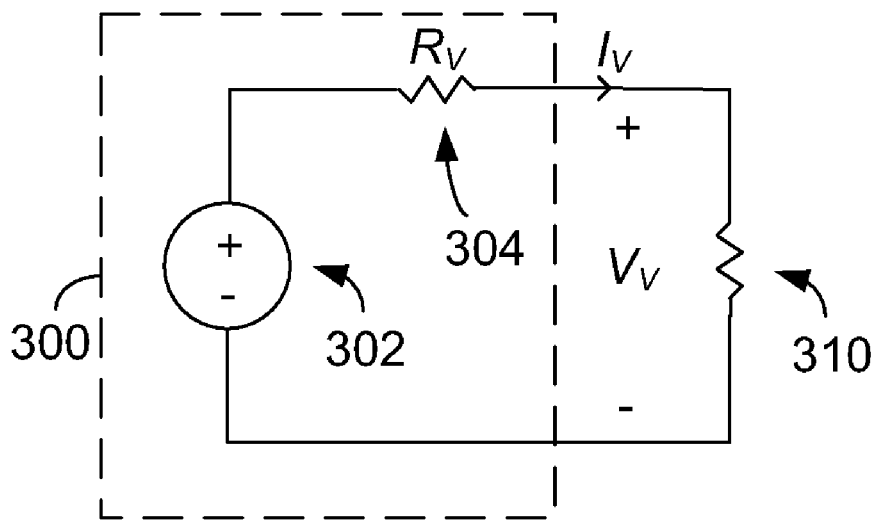
FIG. 3A is a circuit diagram of a voltage source driving a load.
Figure 3B:
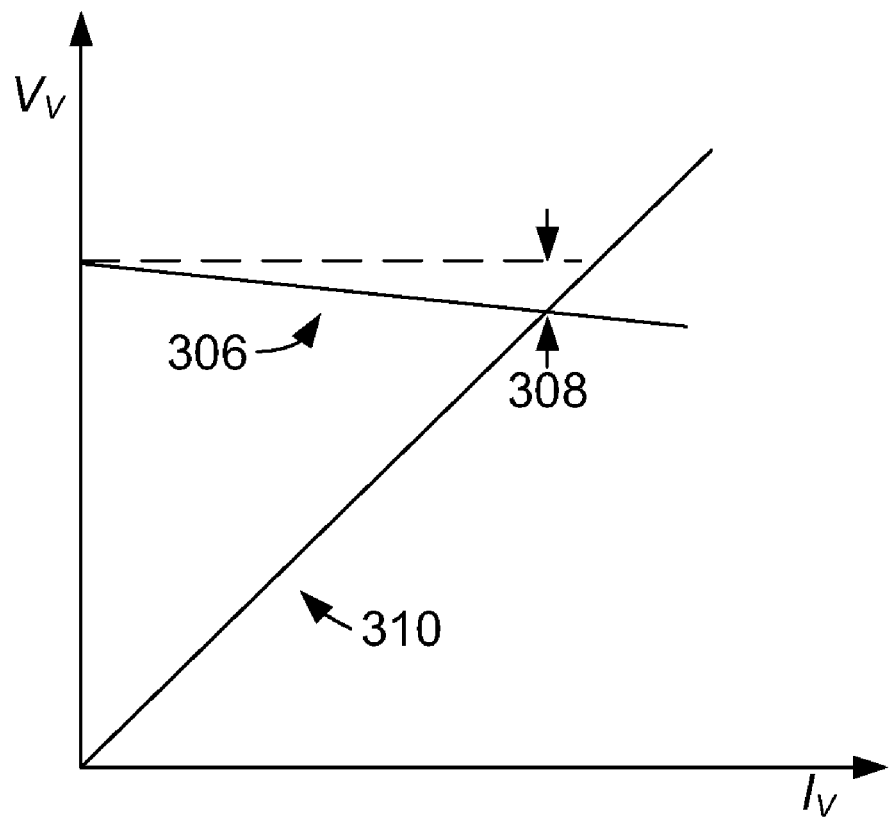
FIG. 3B is a current-voltage characteristic for the circuit of FIG. 3A.

FIG. 3A shows a circuit with a voltage source 300 and a load resistor 310. The voltage source 300 (e.g., a Li-Ion or NiMHd battery) is modeled by an ideal voltage source 302 (of constant voltage $V_0$) in series with a resistor 304 representing the output resistance of the voltage source 300. The current-voltage characteristic 306 for this voltage source 300 is shown in FIG. 3B, along with the "load line" for the load 310 (i.e., the current-voltage characteristic of the load resistor 310). The small output resistance $R_V$ represented by the resistor 304 causes a sag 308 in the output voltage $V_V$ of the voltage source 300 as a function of output current $I_V$. The size of the sag 308 increases as the load resistance $R_L$ (i.e., the slope of the load line) decreases.

Figure 4A:
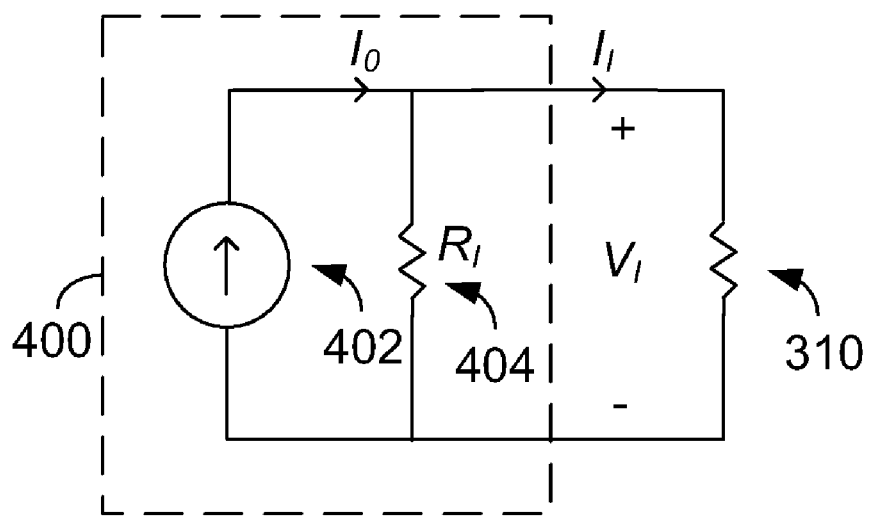
FIGS. 4A and 4C are equivalent circuit diagrams of a current source driving a load.
Figure 4B:
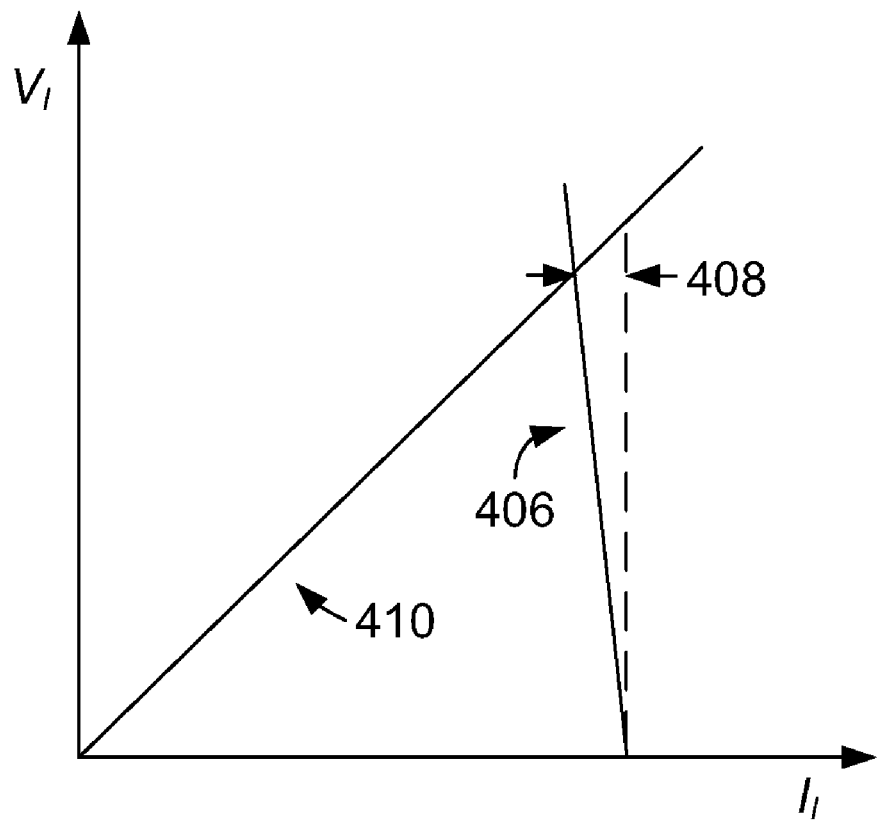
FIG. 4B is current-voltage characteristic for the circuit of FIGS. 4A and 4C.
Figure 4C:
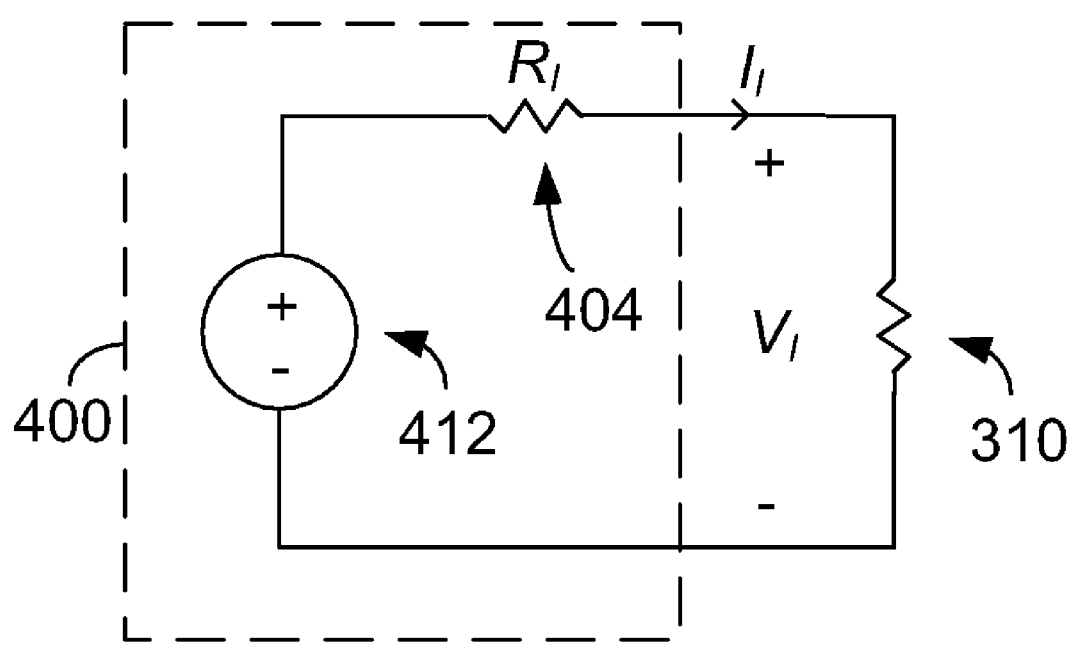

FIG. 4A shows a circuit with a current source 400 and a load resistor 310. The current source 400 is modeled by an ideal current source 402 (of constant current $I_0$) in parallel with a resistor 404 representing the output resistance of the current source 400. The current-voltage characteristic 406 for this current source 400 is shown in FIG. 4B, along with the load line for the load resistor 310. In this case, the large output resistance $R_1$ represented by the resistor 404 causes a sag 408 in the output current $I_1$ of the current source 400 as a function of output voltage $V_1$. The size of the sag 408 increases as the load resistance $R_L$ increases. This current source 400 can equivalently be modeled by an ideal voltage source 412 in series with the resistor 404, where the voltage $V_{EQ}$ of the equivalent ideal voltage source 412 is $V_{EQ}=I_0R_1$ (FIG. 4C).

Figure 5A:
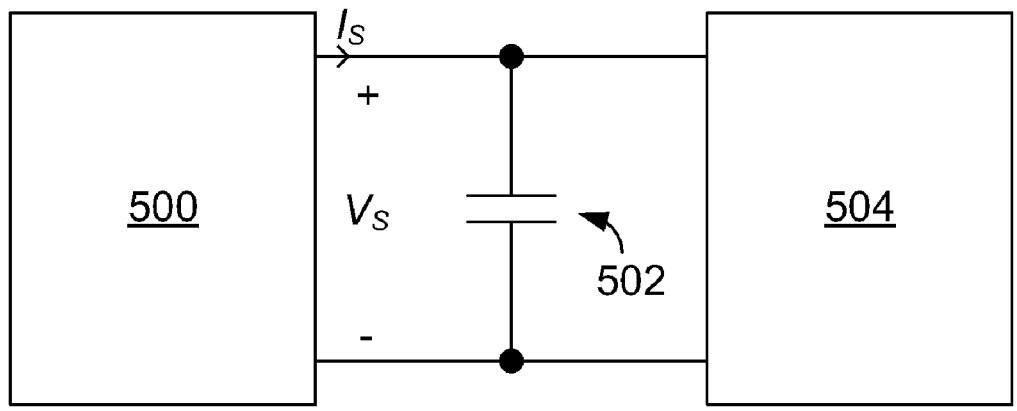
FIGS. 5A and 6A are circuit diagrams of a power converter in parallel with a capacitor coupled to a load.
Figure 5B:
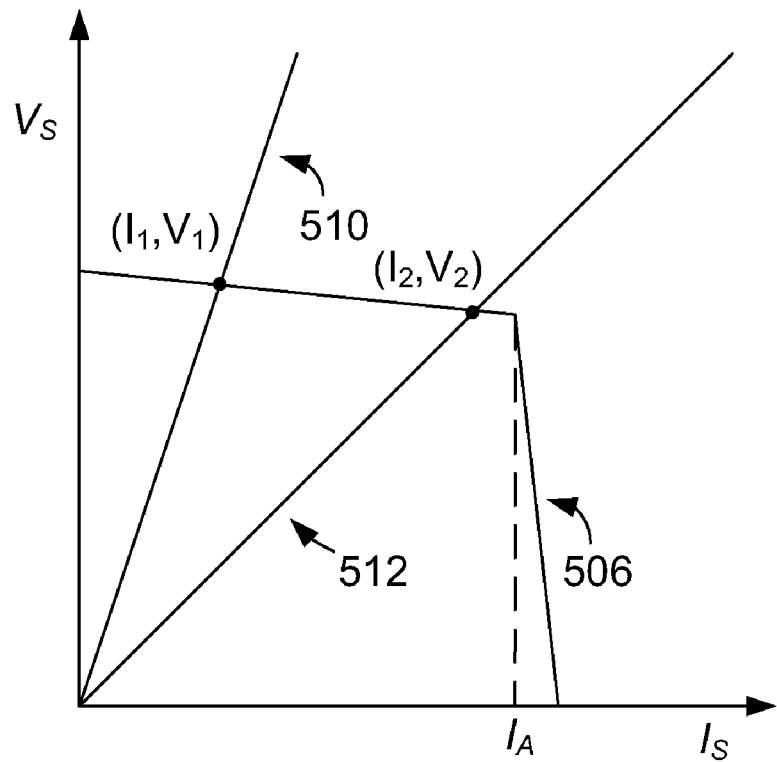
FIGS. 5B and 6B are current-voltage characteristics for the circuits of FIGS. 5A and 6A, respectively.
Figure 5C:
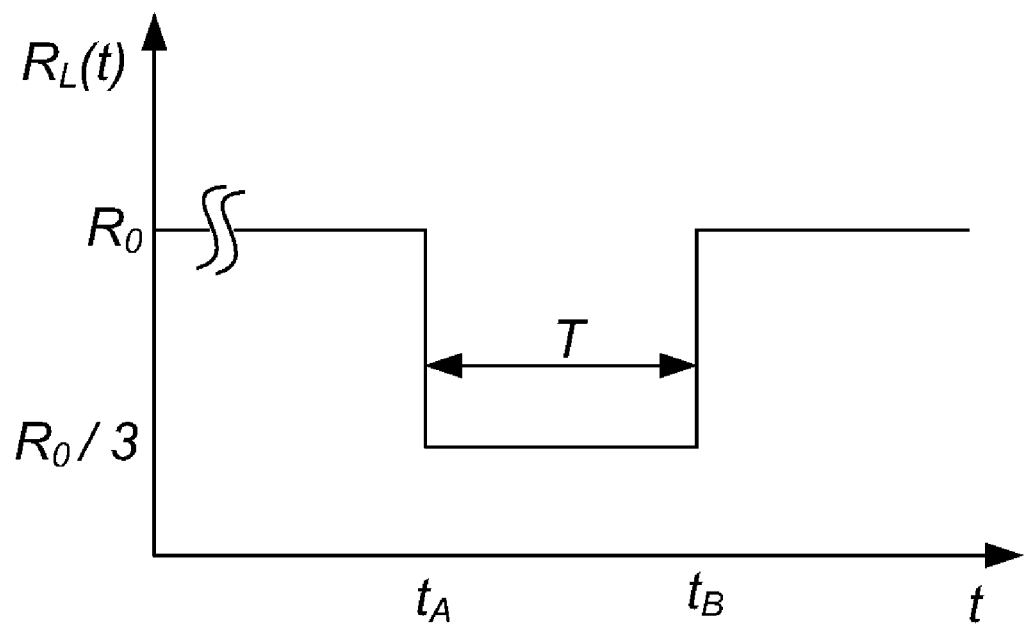
FIGS. 5C and 5D are time plots for circuit variables of the circuit of FIG. 5A.

FIG. 5A shows an example of a power converter 500 in parallel with a capacitor 502. The power converter and the capacitor cooperatively supply power to a variable load 504. In this example, the power converter 500 has a current-voltage characteristic 506 as shown in FIG. 5B. The power converter 500 has the characteristics of the voltage source 300 (e.g., has a low effective output resistance $R_V$) for output current $I_S$ values from 0 to $I_A$ and has the characteristics of the current source 400 (e.g., has a high effective output resistance $R_1$) for output current $I_S$ above $I_A$, limiting the current that can be supplied from the power converter 500. In one example, the variable load 504 temporarily demands more power by dropping an input resistance $R_L(t)$ from a value of $R_0$ (corresponding to a "nominal" load line 510) to a value of $R_0/3$ (corresponding to a "peak" load line 512) for a time period $T=t_A-t_B$, after which the resistance returns to the value $R_0$, as shown in the plot of FIG. 5C.

Figure 5D:
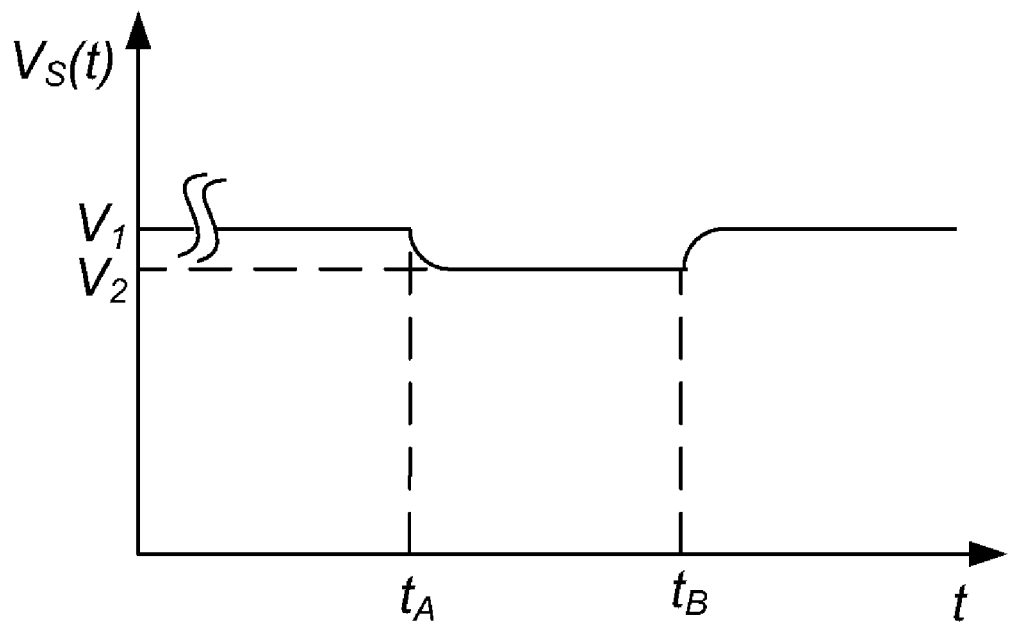

The nominal load line 510 intersects the current-voltage characteristic 506 at a current $I_1$ and a voltage $V_1$. The peak load line 512 intersects the current-voltage characteristic 506 at a current $I_2$ that is larger than $I_1$, and a voltage $V_2$ that is slightly lower than $V_1$. These intersections of the load lines with the current-voltage characteristic 506 give the asymptotic "DC solutions" for current and voltage after transients due to the capacitor 502 decay. The capacitor 502 provides continuity in the change of the capacitor voltage (equal to $V_S(t)$) over time. FIG. 5D shows the voltage $V_S(t)$ across the power converter 500, the capacitor 502, and the variable load 504 as a function of time. After the load resistance drops at time $t_A$, the voltage $V_S(t)$ drops exponentially from $t_A$ and $t_B$ according to:

$$V_S(t)=V_2+(V_1-V_2)\exp(-(t-t_A)/\tau_A),$$

where $\tau_A$ is the effective time constant associated with the capacitor 502 (with capacitance C), which in this example, is $$\tau_A = \left[\frac{1}{CR_V} + \frac{3}{CR_0}\right]^{-1} \approx CR_V$$

since the output resistance $R_V$ of the power converter 500 is much smaller than the input resistance $R_0/3$ of the variable load 504. After time $t_B$, the voltage $V_S(t)$ rises exponentially back to $V_1$ with the same time constant $\tau_A$. The values of other circuit variables between times $t_A$ and $t_B$, such as the capacitor current $I_C(t)$ and the load current $I_L(t)$, are determined from $V_S(t)$ as:

$$I_C(t) = C\frac{dV_S(t)}{dt} \quad \text{and} \quad I_L(t) = 3\frac{V_S(t)}{R_0}.$$

In this example, the power supplied by the capacitor 502

$$\left(I_C(t)V_S(t) = C\frac{dV_S(t)}{dt}V_S(t)\right)$$

is limited since the capacitor does not discharge deeply when the variable load 504 demands more power. The change in voltage $V_S(t)$ only lasts for a small fraction of the time interval T, causing $$\frac{dV_S(t)}{dt}$$

and thus the power $I_C(t)V_S(t)$ supplied by the capacitor 502 to be limited. To cause the capacitor to discharge deeply (e.g., by more than about 20% and in some examples by more than about 50%) to supply more power to the variable load 504, the current limit can be lowered to correspond to the expected peak demand of the variable load 504 so that the power converter 500 provides a dual-mode capability, as described in the next example (FIGS. 6A–6D).

Figure 6A:
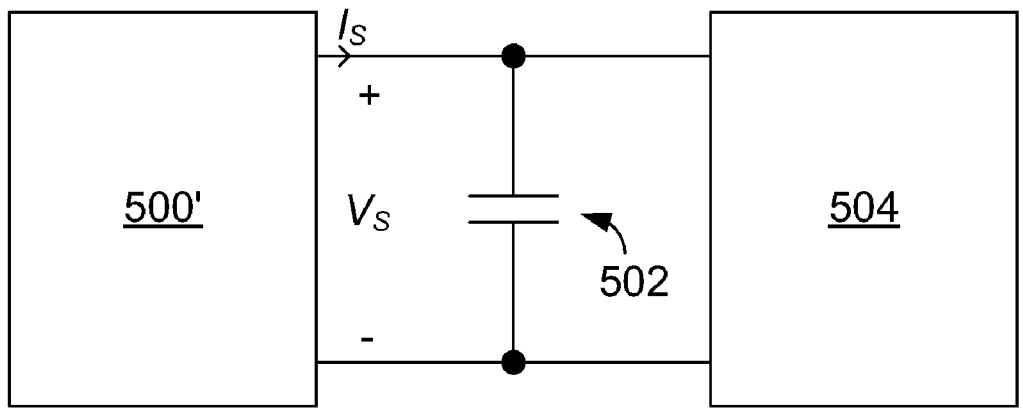
Figure 6B:
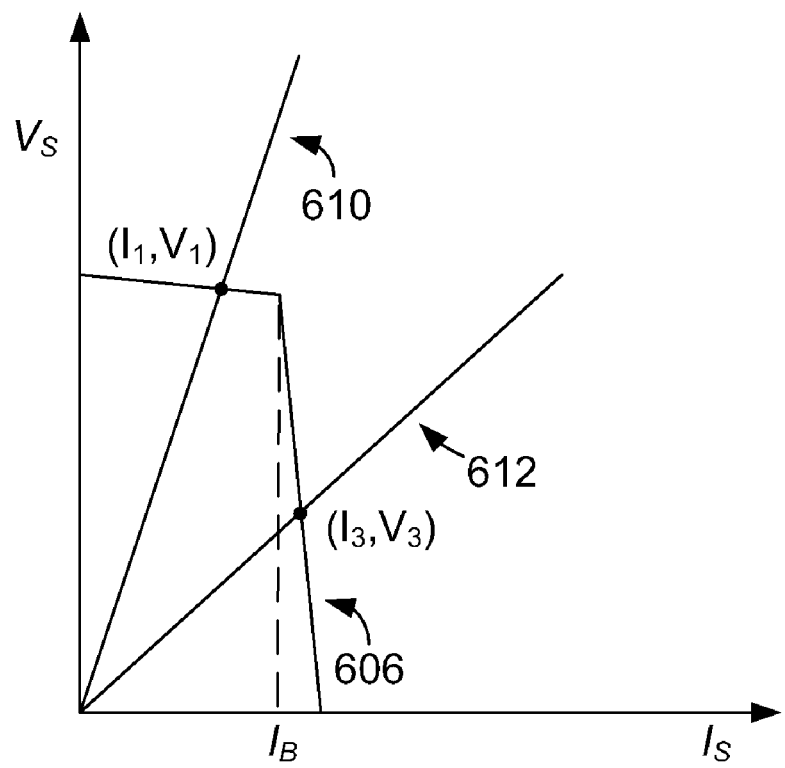

FIG. 6A shows an example of a power converter 500' in parallel with a capacitor 502 cooperatively supplying power to a variable load 504. In this example, the power converter 500' has a current-voltage characteristic 606 as shown in FIG. 6B. The power converter 500' has the characteristics of the voltage source 300 (e.g., has a low effective output resistance) for output current $I_S$ values from 0 to $I_B$ and has the characteristics of the current source 400 (e.g., has a high effective output resistance) for output current $I_S$ above $I_B$. Again, in one example, the variable load 504 temporarily demands more power by dropping an input resistance $R_L(t)$ from a value of $R_0$ (corresponding to a "nominal" load line 610) to a value of $R_0/3$ (corresponding to load line 612) over a time period T, after which the resistance returns to the value $R_0$, as shown in the plot of FIG. 5C.

Figure 6C:
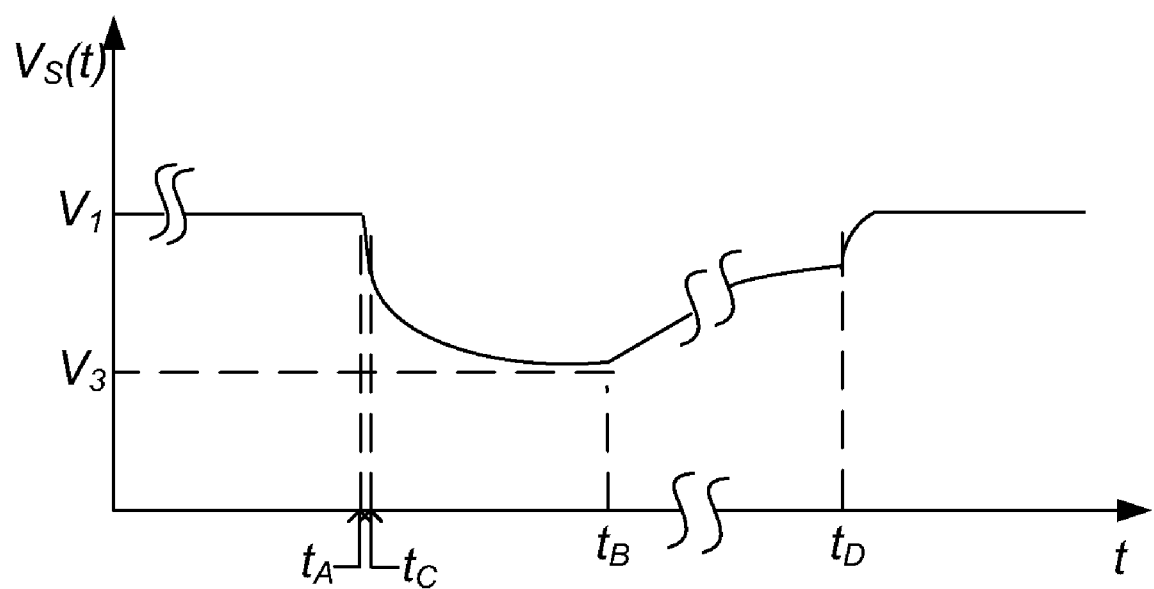
FIG. 6C is a time plot for a circuit variable of the circuit of FIG. 6A.

The nominal load line 610 intersects the current-voltage characteristic 606 at a current $I_1$ and a voltage $V_1$, as in the previous example (FIG. 5B). However, in this example (FIG. 6B), the peak load line 612 intersects the current-voltage characteristic 606 at a current $I_3$ that is larger than $I_1$ but less than $I_2$ and a voltage $V_3$ that is substantially lower than $V_1$ and $V_2$. These intersections of the load lines with the current-voltage characteristic 606 also give the asymptotic DC solutions for current and voltage. FIG. 6C shows the voltage $V_S(t)$ across the power converter 500', the capacitor 502, and the variable load 504 as a function of time. After the load resistance drops at time $t_A$, the voltage $V_S(t)$ drops exponentially from $t_A$ and $t_C$ according to:

$$V_S(t)=V_2+(V_1-V_2)\exp(-(t-t_A)/\tau_A).$$

In this example, at $t_C$ the power converter 500' shifts from a "voltage source" (e.g., a low output resistance) mode to a "current source" (e.g., a high output resistance) mode. Accordingly, the voltage $V_S(t)$ drops exponentially from $t_C$ and $t_B$ according to:

$$V_S(t)=V_3+(V_S(t_C)-V_3)\exp(-(t-t_C)/\tau_B).$$

where $\tau_B$ is the effective time constant associated with the capacitor 502 when the power converter 500 is in the current source mode $$\tau_B = \left[\frac{1}{CR_1} + \frac{3}{CR_0}\right]^{-1} \approx CR_0/3$$

since the output resistance $R_1$ of the power converter 500' in the current source mode is much larger than the input resistance $R_0/3$ of the variable load 504. Since $V_3$ is substantially lower than $V_1$, the capacitor 502 is able to discharge deeply (e.g., by about 50% in this example). After time $t_B$, the voltage $V_S(t)$ rises exponentially back to the voltage $V_S(t_C)$ at which the power converter 500' switches modes with the time constant $$\tau_C = \left[\frac{1}{CR_1} + \frac{1}{CR_0}\right]^{-1} \approx CR_0.$$

At a time $t_D$, the power converter 500' switches back to the voltage source mode. As in the previous example, the values of other circuit variables between times $t_A$ and $t_B$, such as the capacitor current $I_C(t)$ and the load current $I_L(t)$, are determined from $V_S(t)$ as:

$$I_C(t) = C\frac{dV_S(t)}{dt} \quad \text{and} \quad I_L(t) = 3\frac{V_S(t)}{R_0}.$$

In this example, the power supplied by the capacitor $$\mathbf{502}\left(I_C(t)V_S(t) = C\frac{dV_S(t)}{dt}V_S(t)\right)$$

is larger since the capacitor does discharge deeply when the variable load 504 demands more power. The change in voltage $V_S(t)$ lasts over the entire time interval T, causing $$\frac{dV_S(t)}{dt}$$

and thus the power $I_C(t)V_S(t)$ supplied by the capacitor 502 to be large enough to supply most of the additional power in a brief demand for more power by a variable load.

Figure 6D:
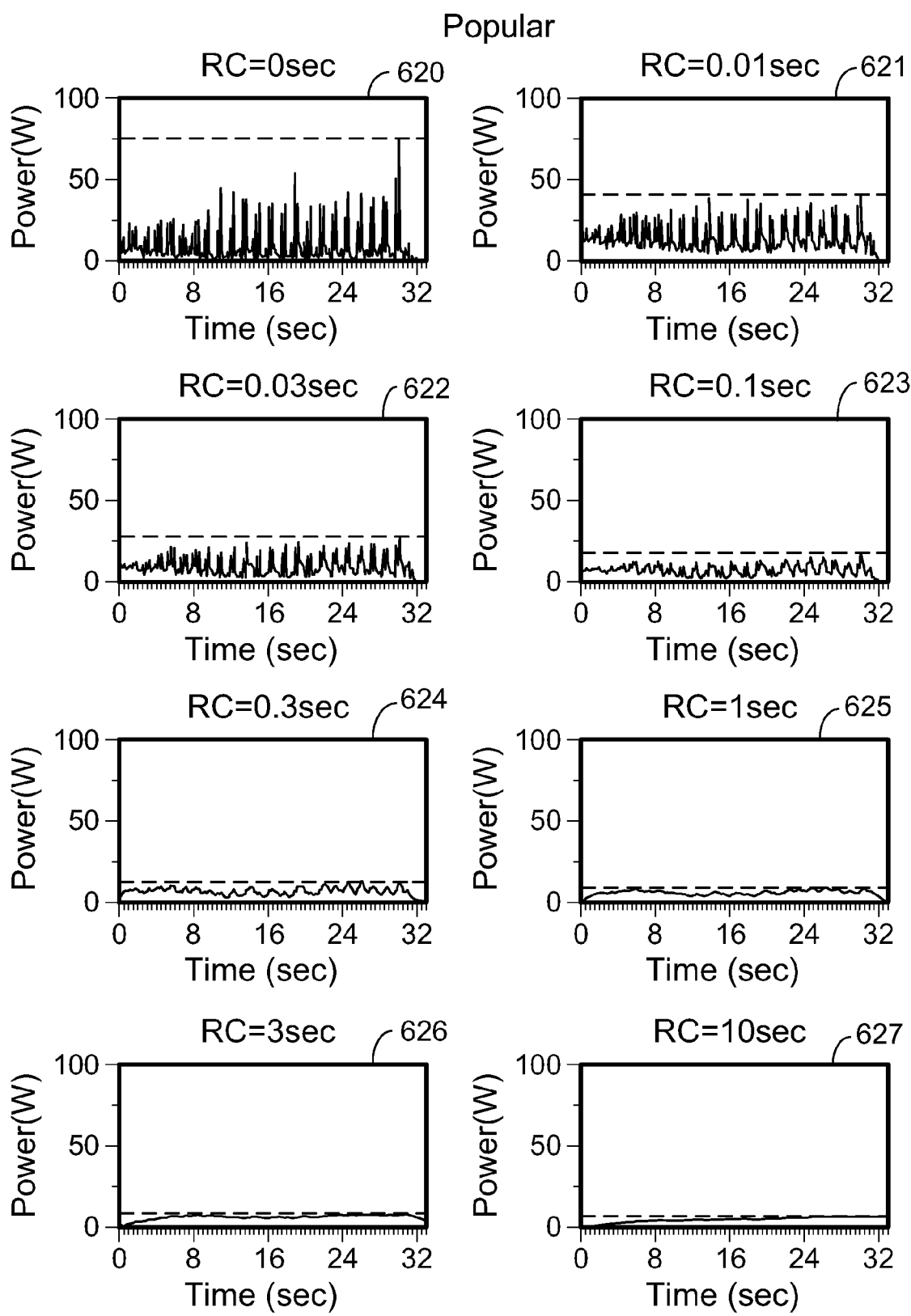
FIGS. 6D–6F are plots of power consumption dynamics for different types of music.
Figure 6E:
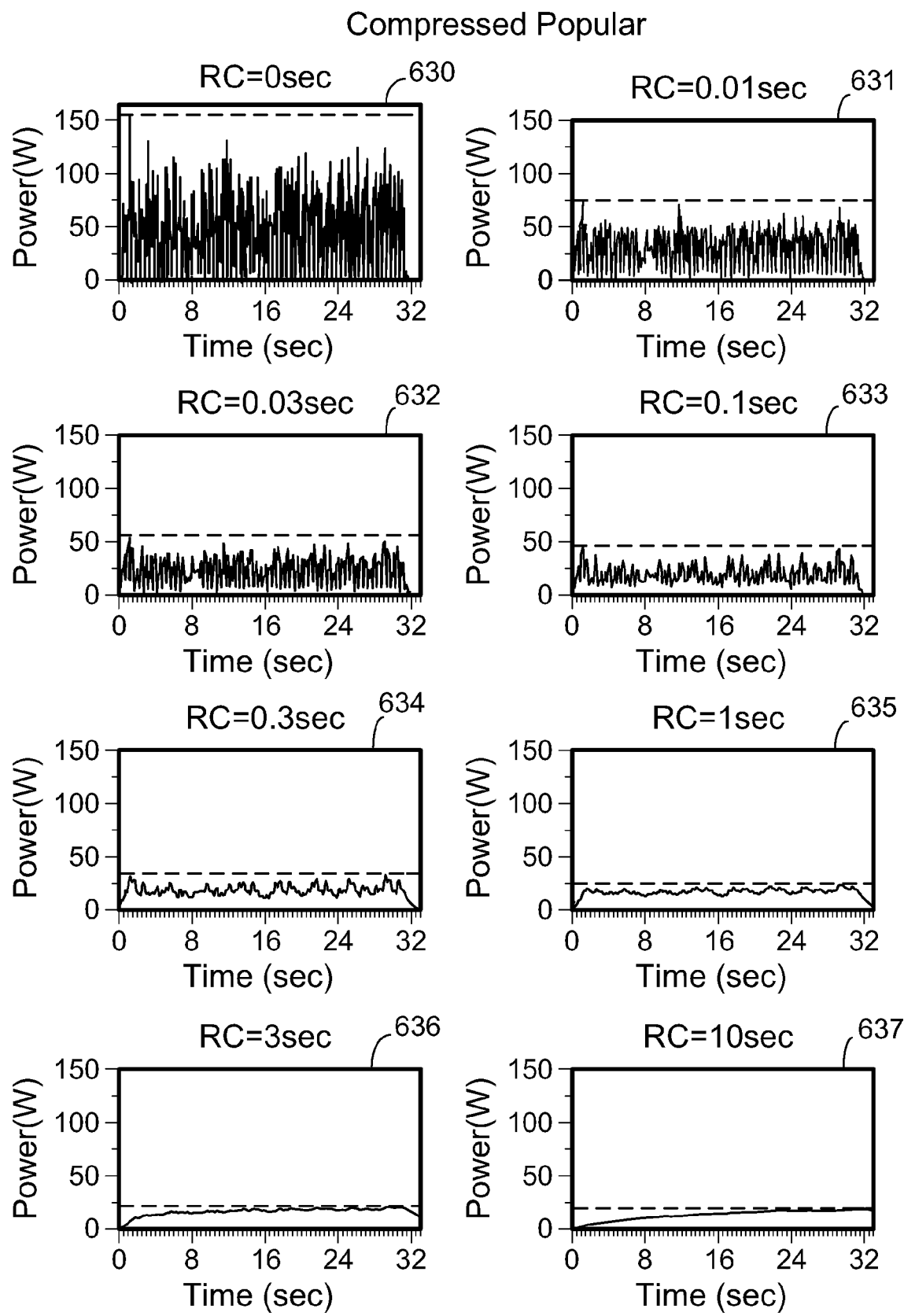
Figure 6F:
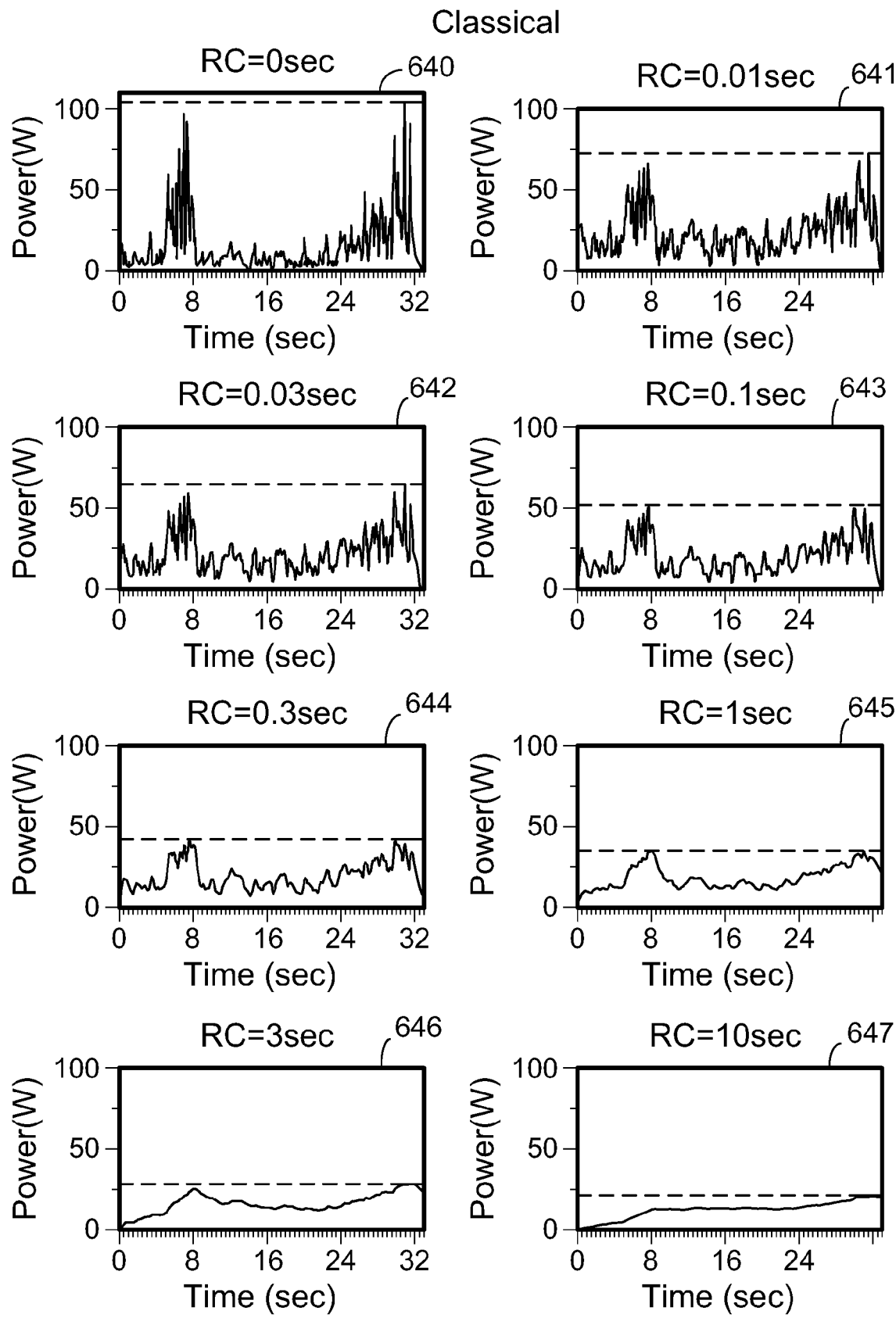

While the demand for more power in these examples is modeled as an instantaneous reduction of input resistance $R_L(t)$ for a time period T, a variable load such as an audio power amplifier may exhibit a continuous change in input resistance $R_L(t)$ with a more complex time dependency having changes that follow time scales present in a music signal (e.g., on the order of milliseconds or as high as tens of seconds) that represent a brief demand for a high peak power. Examples of power consumption dynamics for different types of music are shown in FIGS. 6D–6F. The plots shown in FIGS. 6D–6F are based on a simulated typical audio system, incorporating power converter control as described herein, playing exemplary music passages of different music types.

FIG. 6D shows plots 620–627 of residual power drawn from a power source to play an exemplary passage of uncompressed popular music (after the power converter causes some of the power to be supplied from a capacitive element) as a function of time for different values of the effective time constant $\tau$ of the capacitive element during a peak power demand (e.g., $\tau=R_{LP}C$ where C is the effective capacitance of the capacitive element 102 and $R_{Lp}$ is the resistance of the amplifier at peak power demand). In each plot, the vertical axis gives instantaneous residual power drawn from the power source in Watts, and the horizontal axis gives time in seconds. Each of the plots 620–627 corresponds to a different time constant labeled as "RC." The peak residual power for each plot is shown as a dotted line. In this example, peak residual power is progressively reduced from about 40 W (plot 621) to about 7 W (plot 627) when RC is increased from 0.01 seconds (plot 621) to 10 seconds (plot 627). For comparison, plot 620 shows the power without a capacitive element (or RC=0).

FIG. 6E shows similar plots 630–637 for an exemplary passage of compressed popular music. In this example, peak residual power is reduced from about 70 W (plot 631) to about 20 W (plot 637) when RC is increased from 0.01 seconds (plot 631) to 10 seconds (plot 637).

FIG. 6F shows similar plots 640–647 for an exemplary passage of classical music. In this example, peak residual power is reduced from about 67 W (plot 641) to about 20 W (plot 647) when RC is increased from 0.01 seconds (plot 641) to 10 seconds (plot 647).

These plots in FIGS. 6D–6F demonstrate the difference in power dynamics of various types of music: the uncompressed popular music passage has a lot of strong spikes of a relatively short duration (e.g., about 1–100 ms), the compressed popular music passage has on average about a 12 dB lower peak-to-average (PTA) power ratio (or "crest factor"), while the classical music passage exhibits periods of very loud passages which may last, for example, for many seconds or tens of seconds.

Figure 7A:
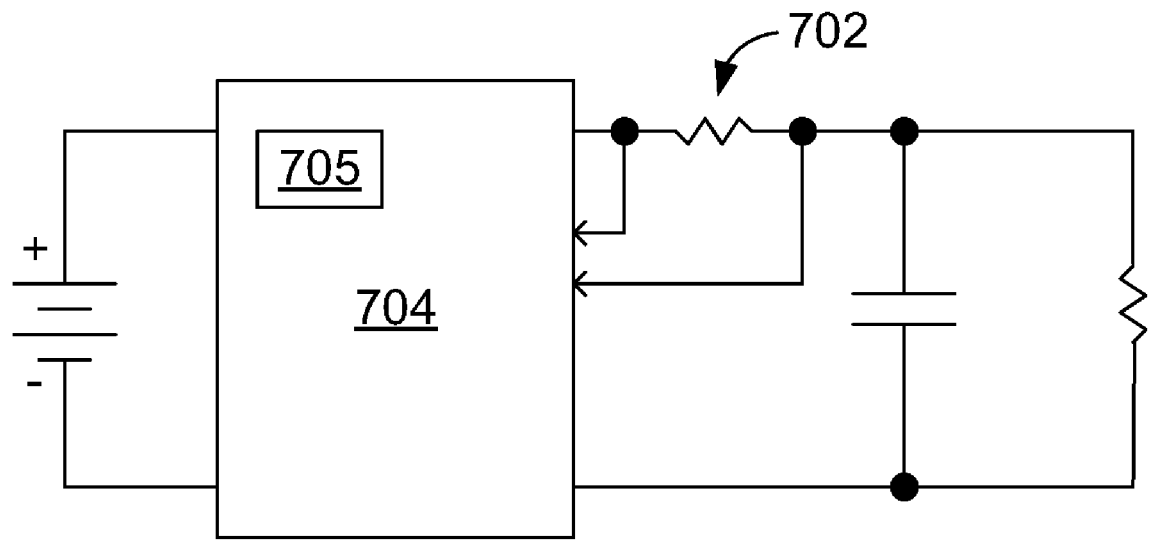
FIGS. 7A–7D are circuit diagrams showing different sensing techniques.
Figure 7B:
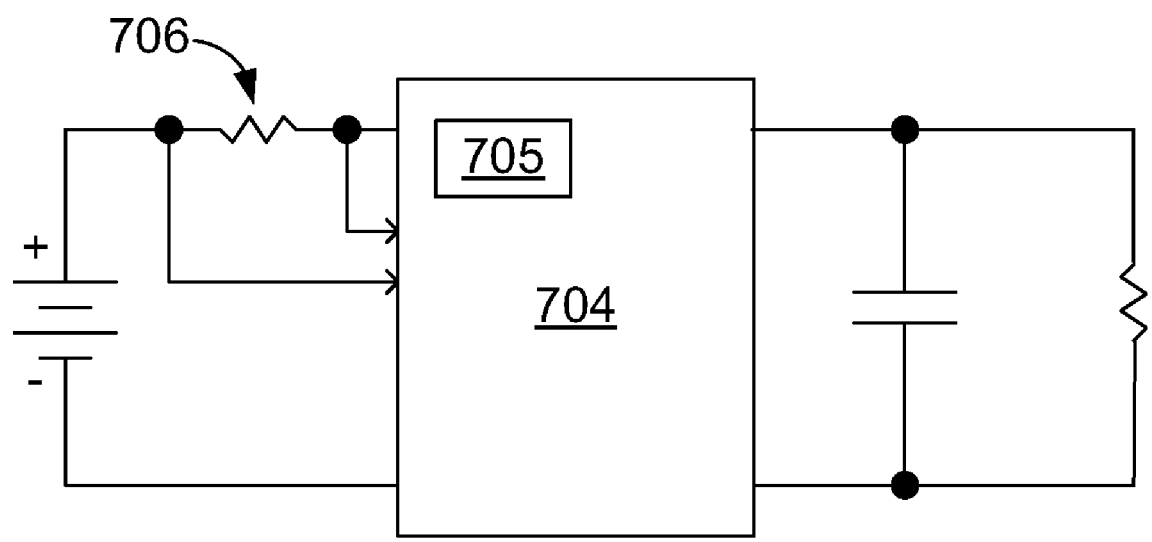
Figure 7C:
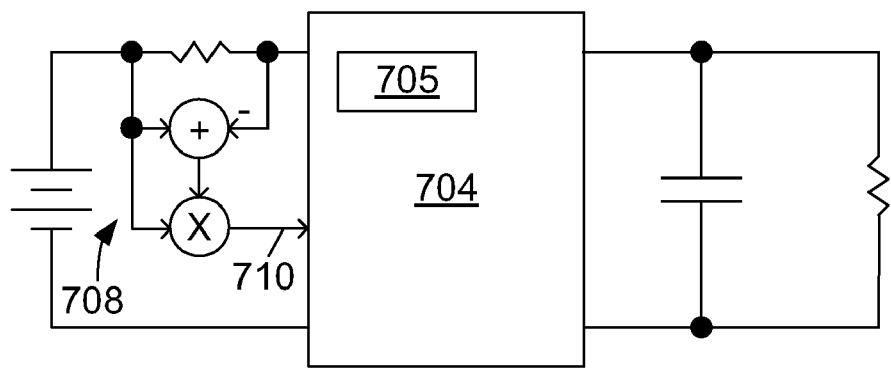

As shown in FIGS. 7A–7C, the DC-DC power converter 200A (FIG. 2A) can use any of a variety of parameters to implement the dual-mode capabilities described above. For example, the circuit in FIG. 7A includes a resistor 702 for sensing the output current of a switching power supply 704. The voltage across the resistor 702 is fed back to the switching power supply 704 and used to control the output voltage according to a desired current-voltage characteristic. In another example, the circuit in FIG. 7B includes a resistor 706 for sensing the input current of the switching power supply 704 for achieving a desired current-voltage characteristic. In another example, the circuit in FIG. 7C includes circuitry 708 for sensing the input power of the switching power supply 704. The circuitry 708 generates a voltage 710 that is the product of the input voltage and a voltage proportional to the input current, and is therefore proportional to the input power. When the input power is below a threshold power level the power supply 704 operates according to a current-voltage characteristic of a first mode, and when the input power is above the threshold power level the power supply 704 operates according to a current-voltage characteristic of a second mode. Other parameters can be used to control the current-voltage characteristic of the switching power supply 704. The power supply 704 includes a control module 705 to switch modes based on the sensed parameter. One possible implementation of such a control module is described in more detail below (e.g., control module 814 in FIG. 8).

In order to achieve high system efficiency, there should be negligible loss in the power converter 200A. The switching power supply 704 can use any of a variety of low-loss conversion techniques (e.g., a boost converter, a buck converter, a flyback converter, or a single-ended primary inductance converter).

Figure 7D:
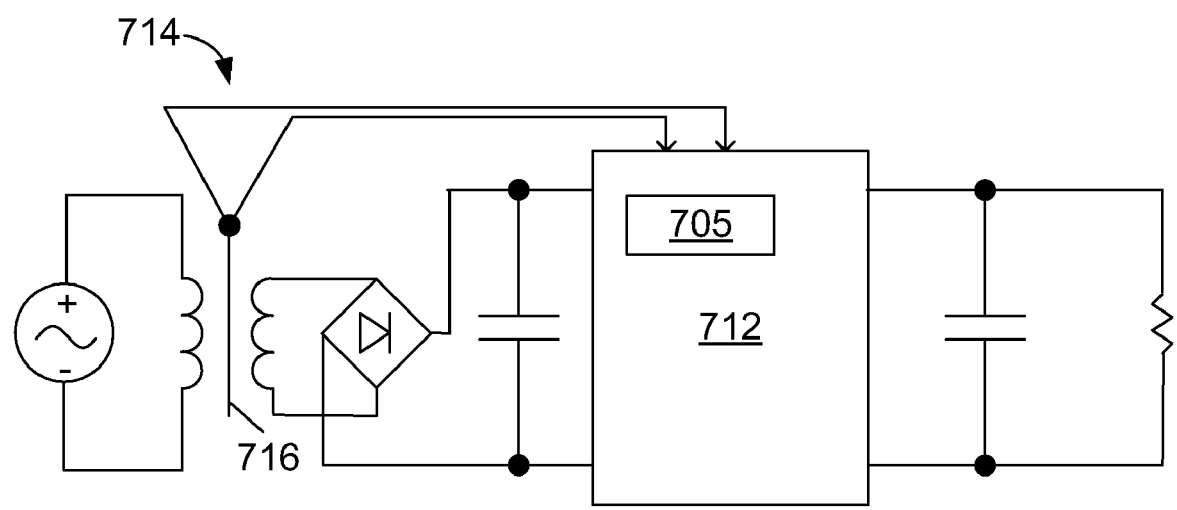

Similarly, the AC-DC power converter 200B (FIG. 2B) can use any of a variety of parameters to implement the dual-mode capabilities described above. The AC-DC power converter 200B can use techniques similar to those described above. Alternatively, as shown in FIG. 7D, an AC-DC converter 712 includes circuitry 714 for sensing the temperature of the AC transformer core 716. The AC-DC converter 712 switches between different current-voltage characteristics (i.e., different modes) based on comparing the sensed temperature to a threshold temperature. In some implementations temperature may optionally be used in conjunction with other control parameters (e.g., output current, input power, input current, etc.). In some implementations temperature modifies the current-voltage characteristic (e.g., by making $I_B$ a function of temperature). Other parameters can be used to control the current-voltage characteristic of the switching converter 712. The converter 712 also includes a control module 705 to switch modes based on the sensed parameter.

In some implementations, the trigger condition that causes the control module 705 to switch modes is programmable (e.g., by programming the trigger condition into a microprocessor). For example, the converter 712 senses various circuit parameters (e.g., input power, output current, temperature, etc.) and the circuit parameter that is used by the control module 705 to switch modes is programmable. Alternatively, the value of a circuit parameter that triggers a change in modes can be programmable.

Figure 8:
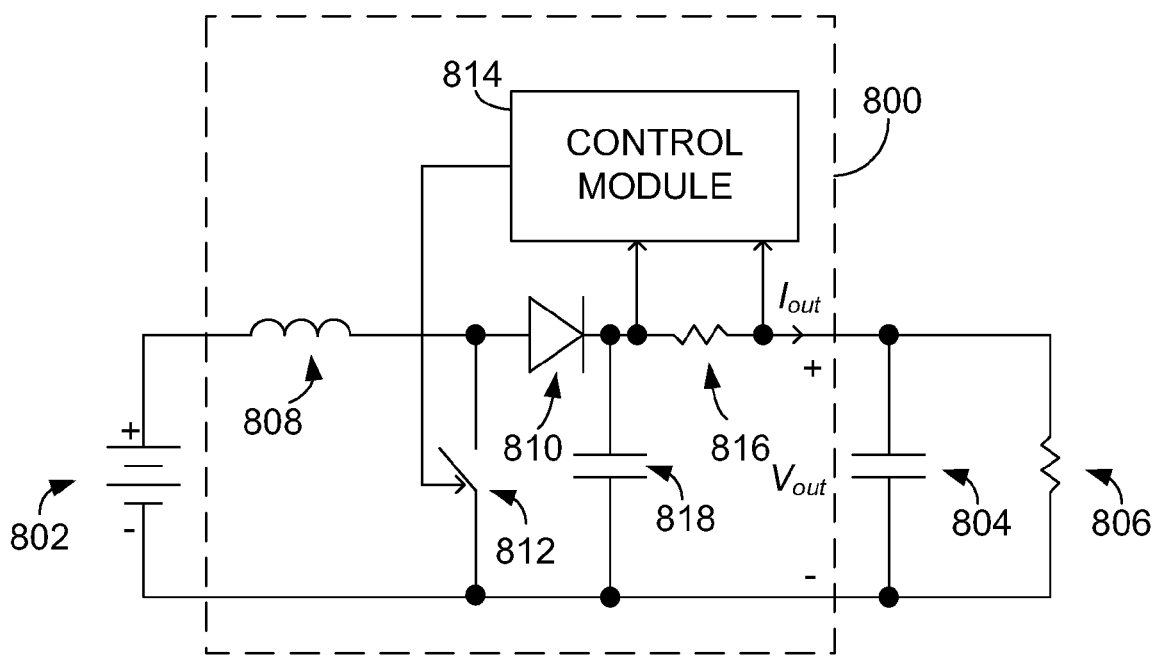
FIG. 8 is a circuit diagram for an implementation of the sensing technique of FIG. 7A.

FIG. 8 shows a Boost type power converter circuit 800 implementing the sensing technique of FIG. 7A. The input of the circuit 800 is connected to a battery 802 with voltage $V_B$ and the output of the circuit 800 is coupled to a capacitor 804 in parallel with a variable load 806. The circuit 800 includes an inductor 808, a diode 810, and a switch 812 that is controlled by a control module 814 based on the output current $I_{out}(t)$ in a sensing resistor 816. The circuit 800 also includes a capacitor 818 with a relatively small capacitance to filter out much of the switching frequency, and reduce ripple on the output voltage. In some implementations, the control module 814 includes a microprocessor for controlling the switch operation as a function of sensed output current. The resistance $R_S$ of the sensing resistor 816 is small compared to the load resistance $R_L(t)$.

Figure 9:
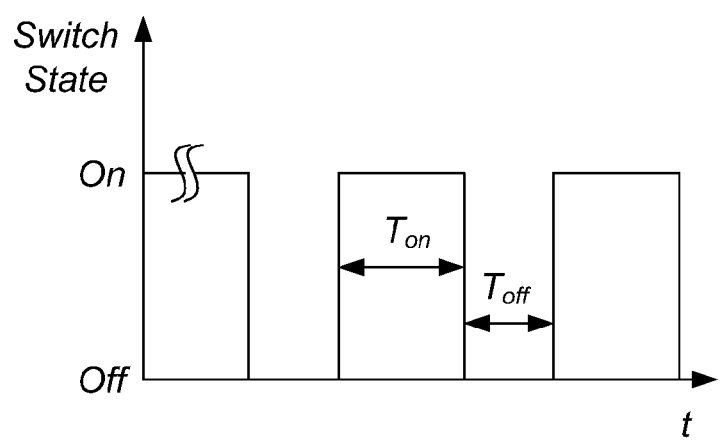
FIG. 9 is a plot of a converter switch operation as a function of time.

Since the circuit 800 is a Boost type, the output voltage $V_{out}(t)$ is higher than the constant input voltage $V_B$. The output voltage is determined by the duty cycle D of the opening and closing of the switch 812. As shown in FIG. 9, the switch 812 is closed for a time $T_{on}$ and open for a time $T_{off}$, so the duty cycle is $D=T_{on}/(T_{on}+T_{off})$. The output voltage $V_{out}(t)$ in steady-state conditions (and neglecting losses in the inductor 808 and the diode 810) is:

$$V_{out}(t)=V_B/(1-D). \quad (1)$$

When the control module 814 senses an output current $I_{out}(t)$ less than a threshold current $I_{th}$, the control module 814 sets the circuit 800 to a voltage source mode. In the voltage source mode, the target output voltage is approximately constant $V_{out}(t)=V_0$. To generate this voltage, the control module 814 sets the duty cycle D to:

$$D=D_0=1-V_B/V_0. \quad (2)$$

When the control module 814 senses an output current $I_{out}(t)$ greater than the threshold current $I_{th}$, the control module 814 sets the circuit 800 to a current source mode. In the current source mode the, the target output voltage varies with output current according to a target current-voltage characteristic:

$$V_{out}(t)=V_0-(I_{out}(t)-I_{th})R_{out}, \quad (3)$$

where $R_{out}$ is a simulated output resistance parameter for the circuit 800 that is controlled by the control module 814. To implement a high output impedance source, the control module 814 selects a large value of $R_{out}$ (e.g., $R_{out} \gg R_L(t)$). The value of $R_{out}$ may be constant, or alternatively, the value of $R_{out}$ may vary with sensed output current $I_{out}(t)$ Equations (1)–(3) yield the following value of duty cycle D that the control module 814 uses to control the switch 812 in response to the sensed output current $I_{out}(t)$ in the current source mode:

$$D = D_0 + \frac{1-D_0}{1-V_B/[(I_{out}(t)-I_{th})R_{out}(1-D_0)]} \quad (4)$$

A control module using other control parameters can be implemented in a similar way. For example, the duty cycle of a Boost type or other type of switching power converter can be a function of input power when the input power crosses a threshold value.

Figure 10A:
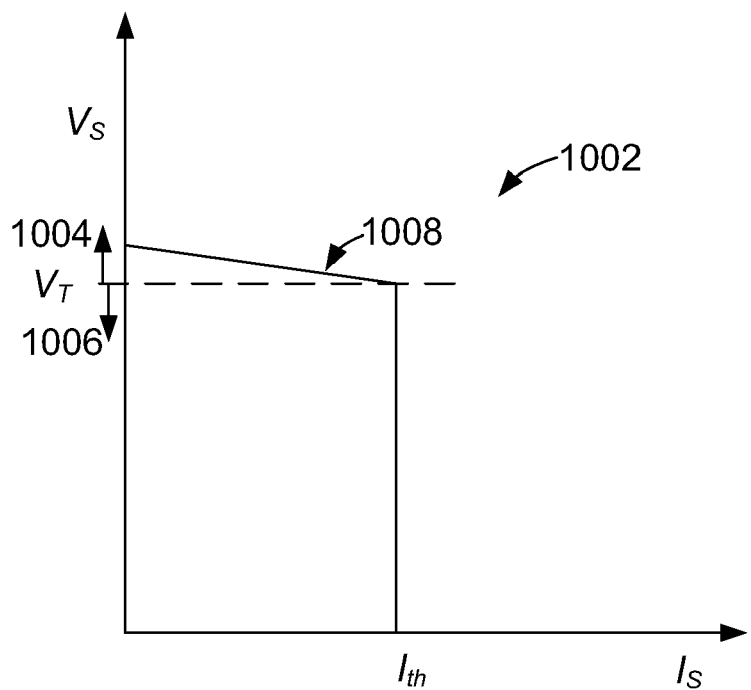
FIGS. 10A and 10B are exemplary current-voltage characteristics.
Figure 10B:
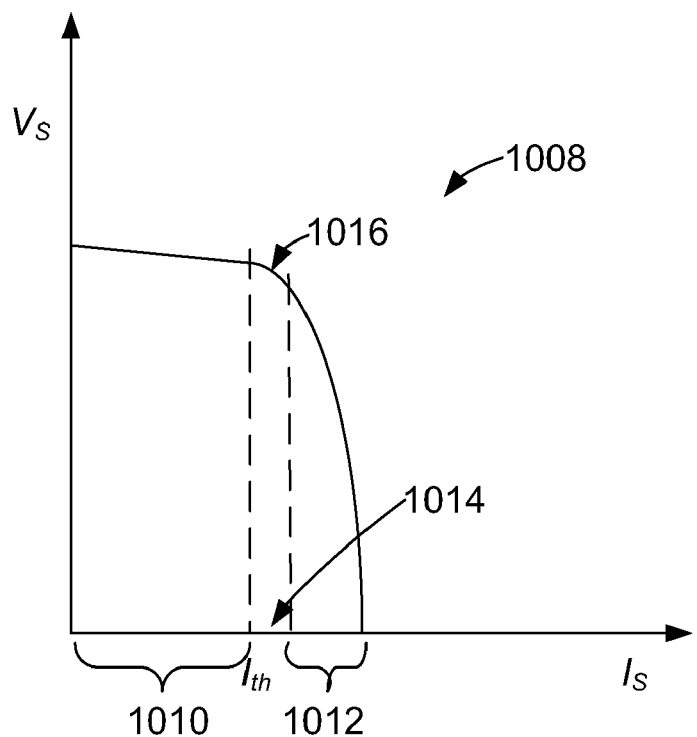

FIGS. 10A and 10B show exemplary current-voltage characteristics for a power converter that can be used to cause a capacitive element to discharge deeply to supply more power to a variable load. In FIG. 10A, the characteristic 1002 has a first mode 1004 characterized by a shallow slope of the voltage versus current plot, and a second mode 1006 in which the current $I_S$ is limited to a maximum current $I_{th}$ for voltages $V_S$ below a transition voltage $V_T$. For example, in the implementation of FIG. 8, the first mode 1004 may be achieved by setting $R_{out}$ in Equation (4) to small value for $I_S$ values less than $I_{th}$ and the second mode 1006 may be achieved by setting $R_{out}$ in Equation (4) to a large value for $I_S$ values equal to or greater than $I_{th}$.

In FIG. 10B, the characteristic 1008 has a first mode 1010 characterized by a shallow slope of the voltage versus current plot, and a second mode 1012 characterized by a steep slope of the voltage versus current plot. Between the first and second modes, the characteristic 1008 has a "transition zone" 1014 that has a "knee" 1016 in the voltage versus current plot. For example, in the implementation of FIG. 8, the first mode 1010 may be achieved by setting $R_{out}$ in Equation (4) to a small value for $I_S$ values less than $I_{th}$. The transition zone 1014 and second mode 1012 may be achieved by setting $R_{out}$ in Equation (4) to an increasing value as a function of $I_S$ for $I_S$ values equal to or greater than $I_{th}$. In one implementation, the value of D in Equation (4) can be controlled using a programmable device (e.g., a microprocessor). In this implementation, the value of $R_{out}$ in Equation (4) can be controlled (as a function of $I_S$) in software, for example, using a look-up table or a polynomial curve fit.

Other features of a current-voltage characteristic can be controlled in various implementations. For example, the transition between modes and the slope of the voltage versus current plot can be selected to ensure a minimum operating voltage (e.g., for an audio amplifier) is maintained for a given peak demand (e.g., minimum load resistance). The transition between modes can optionally be tunable.

Figure 10C:
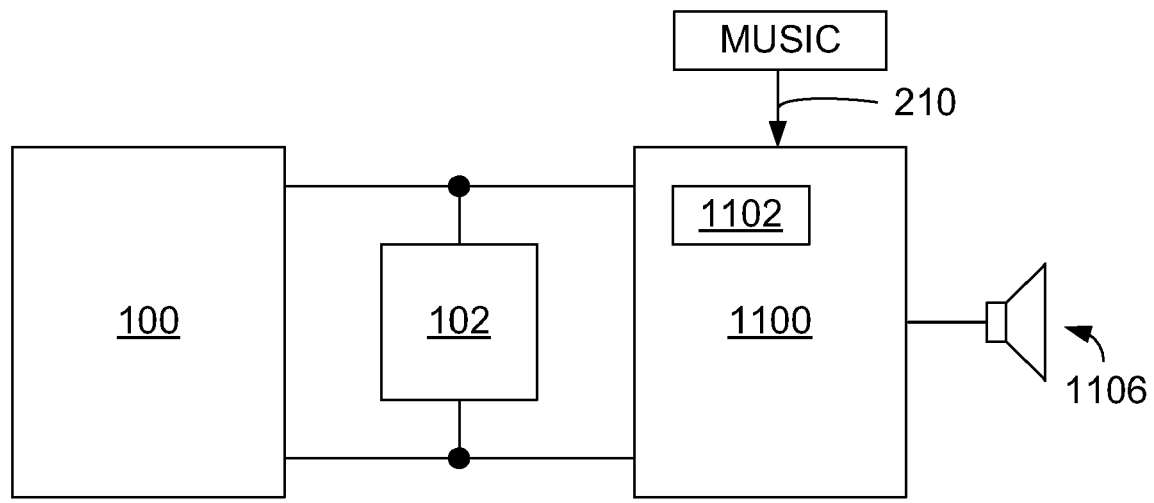
FIGS. 10C and 10D are examples including an audio amplifier with gain that depends on the power converter behavior.
Figure 10D:
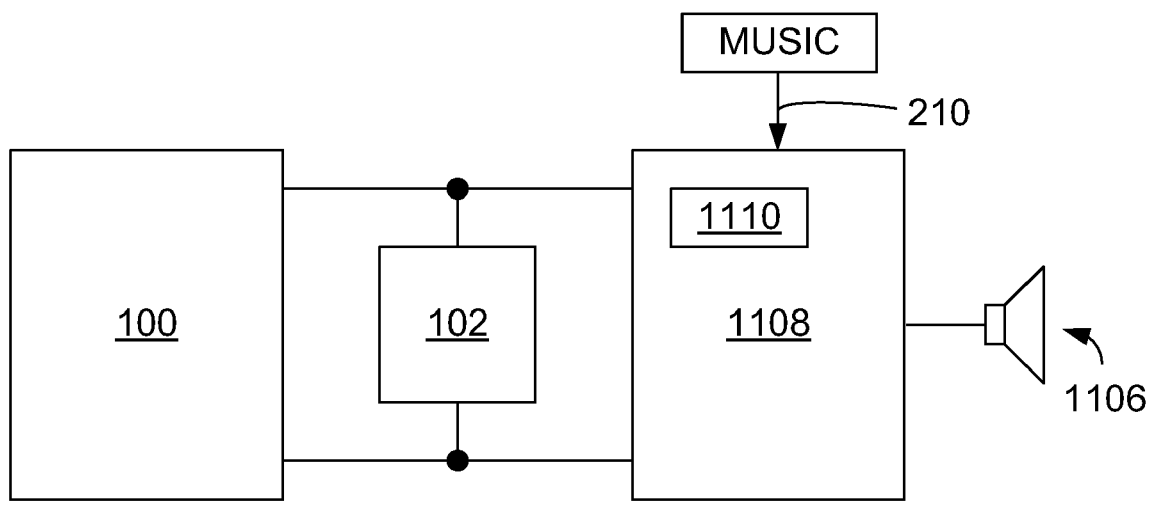

For a power converter that supplies power to an audio amplifier (e.g., power converter 200A or 200B), features of the audio amplifier can be dependent on the power converter behavior. For example, when the voltage supplied by the power converter drops (e.g., after switching to the current supply mode) the gain of the audio amplifier can be reduced to avoid distortion in the music signal 210 at the amplifier or speaker (e.g., due to signal clipping). In one implementation, shown in FIG. 10C, an audio amplifier 1100 includes a compressor 1102 with a threshold that scales with the voltage supplied by the power converter 100 and capacitive element 102. This variable-threshold compressor 1102 reduces distortion of music played over a speaker 1106. In another implementation, shown in FIG. 10D, an audio amplifier 1108 includes a variable gain circuit 1110 that reduces the gain as the voltage $V_S(t)$ supplied by the power converter 100 and capacitive element 102 reduces, according to a predetermined function. These or other techniques (e.g., a system with any kind of wide-band or multi-band amplitude compressor) can be used to reduce the likelihood of signal clipping at any power converter voltage above a given minimum operating voltage. A compressor could operate based on the voltage supplied by the power converter and capacitor, or on other parameters such as power transformer temperature, loudspeaker temperature, loudspeaker displacement, or any other parameter indicative of an amplified signal level.

By causing some of an increased demand for power to be supplied from a capacitive element, the residual peak power demanded from a source is reduced. The amount of reduction in residual peak power demand depends on the effective time constant $\tau$ and on the type of music that is being amplified. One characteristic of the music that affects the reduction in residual peak power demand is the PTA power ratio. Music with a high PTA power ratio (e.g., uncompressed popular music) is more affected by the integrating effect of a large time constant than music with a low PTA power ratio (e.g., broadcast AM music).

Figure 11:
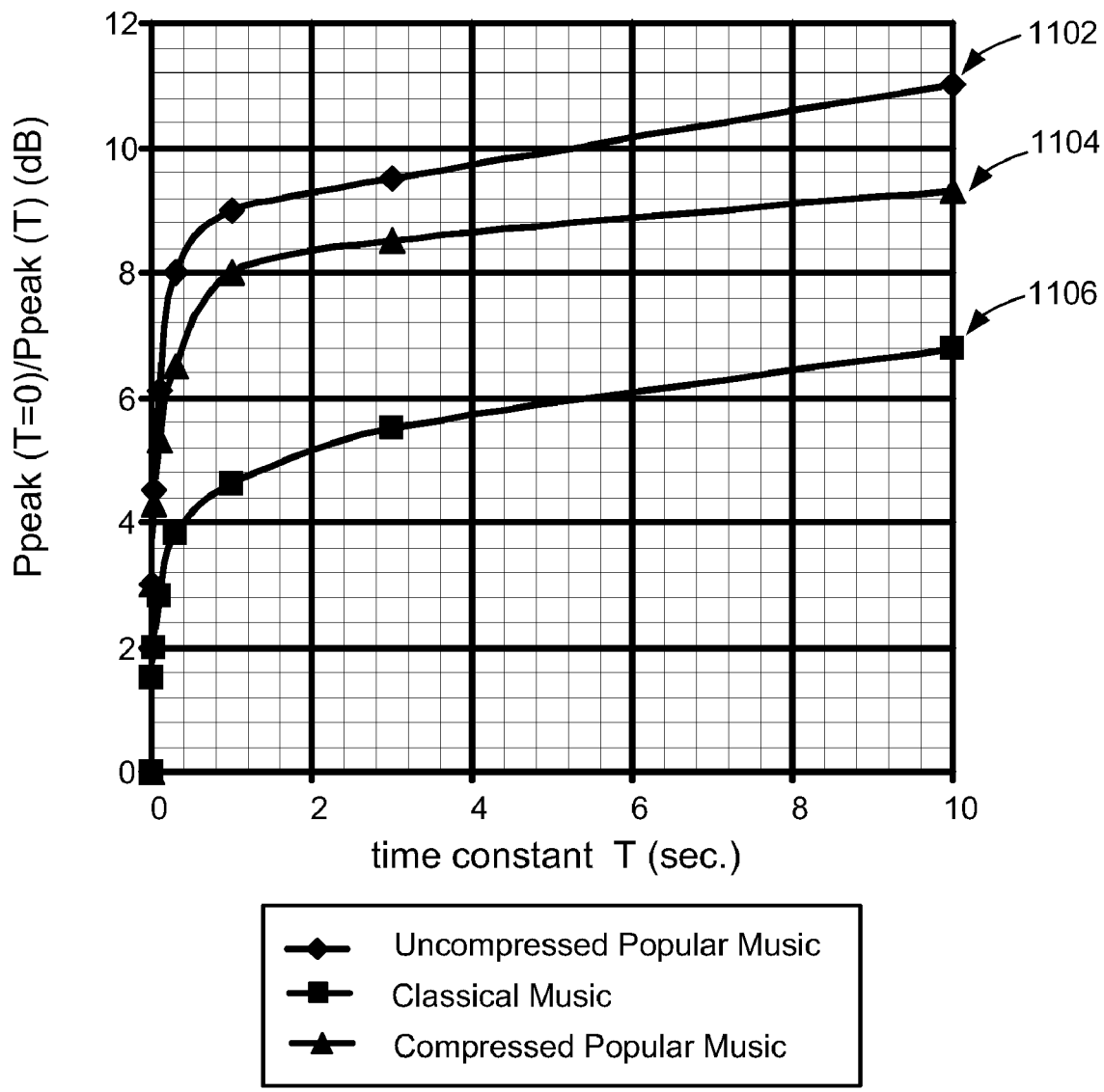
FIG. 11 is a plot of reduction in peak power demand versus effective time constant for different types of music.

FIG. 11 shows semi-log plots of the reduction R in peak power demand due to the capacitive element (in dB) versus the effective time constant $\tau$ (in seconds) for three different types of music: uncompressed popular music (plot 1102), compressed popular music (plot 1104), and classical music (plot 1106). The reduction in peak power demand R is quantified as the ratio between peak power for a power converter having a time constant of zero to peak power for a power converter having the given effective time constant $\tau$, $R=P_{peak}(\tau=0)/P_{peak}(\tau)$. These empirically derived plots demonstrate that the uncompressed popular music used in this example, due to its high PTA power ratio and relatively short duration of the amplitude spikes is the most affected by effective time constant $\tau$ of the power converter. For example, for $\tau\sim5.5$ seconds (FIG. 11, plot 1102), the reduction of the residual peak power demand is 10 dB (or 10 times).

On another end—compressed popular music (e.g., FM or AM broadcast type) has a much lower PTA power ratio (in order to sound louder on average), so the effects of the effective time constant $\tau$ are less pronounced. For example, for the same time constant $\tau\sim5.5$ seconds (FIG. 11, plot 1104) the reduction of the residual peak power demand is 8.7 dB (or 7.5 times).

Classical music typically has PTA power ratio in between that of compressed and uncompressed popular music, but much longer duration of the amplitude spikes. Therefore, the classical music used in this example is affected by the effective time constant of the power supply the least. For example, for the same time constant $\tau\sim5.5$ sec (FIG. 11, plot 1106) the reduction of the residual peak power demand is only 6 dB (or 4 times).

Another way to look at FIG. 11 is that a system having a power source with limited power capabilities is able to play louder by using a capacitive element to provide some of the peak power demand. From the example above for uncompressed popular music with $\tau\sim5.5$ seconds, the available peak power for playing the music will be 10 dB higher from a system that causes peak power to be supplied from a capacitive element than from a system that does not.

Figure 12:
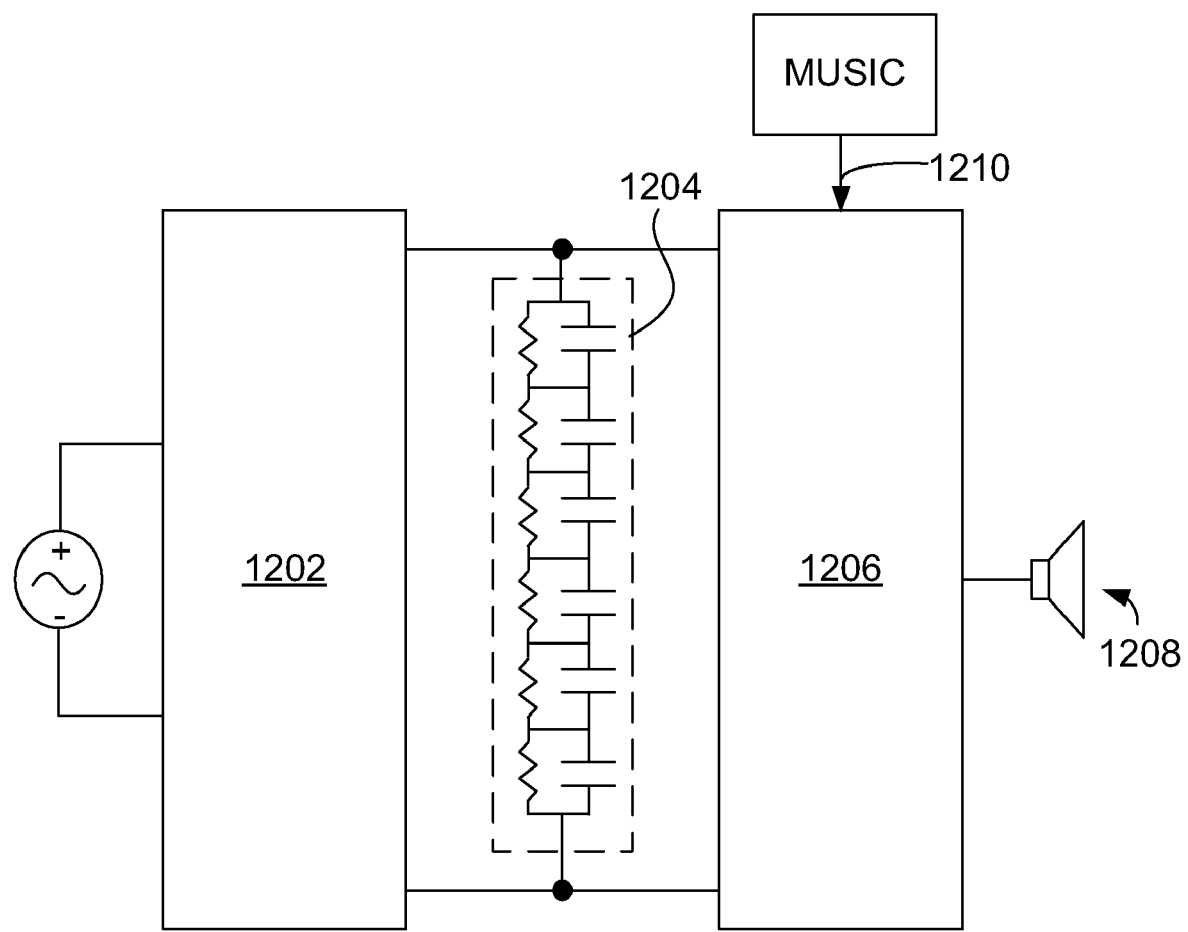
FIGS. 12–14 are circuit diagrams for implementations of a power converter in parallel with a capacitive element coupled to an audio amplifier.

In one implementation shown in FIG. 12, a power supply 1202 (a Hewlett Packard model 6253A DC power supply) powered from an AC mains is connected in parallel with a capacitive element 1204 consisting of six 33 F/2.5 V aerogel super capacitors in series, each capacitor having a 5.1 kΩ shunt resistor, providing a total capacitance of 5.5 F and a maximum voltage of 15 V. The power supply 1202 and capacitive element 1204 power a switching audio amplifier 1206 (a Bose 100 W switching audio amplifier, Bose Corporation) driving a speaker 1208. A music signal 1210 is input into amplifier 1206. When the power supply 1202 had an output current limit set to approximately 3.2 A and a nominal output voltage (i.e., with no load) set to 15 V (for a maximum output power of 48 W), the power supply 1202 and capacitive element 1204 together provided a peak power of 98.7 W to the amplifier 1206 with the output voltage staying above 9 V for all music tested.

Figure 13:
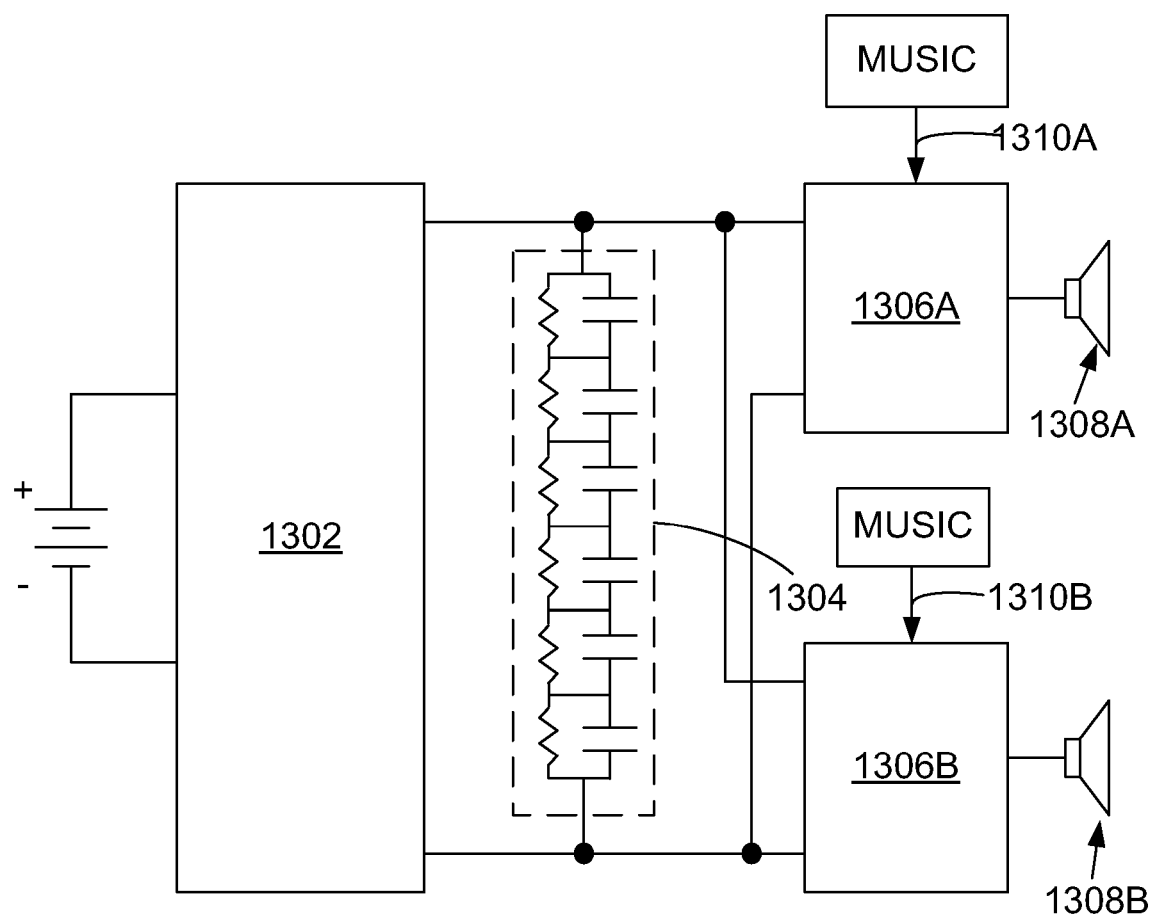

In another implementation shown in FIG. 13, a power supply 1302 (a DC-DC boost converter based on a Linear Technology model LTC1624 switching regulator controller) powered from six 1.2 V batteries (providing 7.2 V total input voltage) is connected in parallel with a capacitive element 1304 consisting of six 10 F/2.5 V aerogel super capacitors in series, each capacitor having a 5.1 kΩ shunt resistor, providing a total capacitance of 1.67 F and a maximum voltage of 15 V. The power supply 1302 and capacitive element 1304 power a pair of audio amplifiers 1306A and 1306B each driving a speaker 1308A and 1308B, respectively. Music signals 1310A and 1310B input into amplifiers 1306A and 1306B, respectively. When the power supply 1302 had an output current limit set to approximately 0.6 A and a nominal output voltage set to 14 V (for a maximum output power of 8.4 W), the power supply 1302 and capacitive element 1304 together provided a peak power of 25.2 W to the amplifiers 1306A and 1306B with the output voltage staying above 9.5 V for all music tested.

Figure 14:
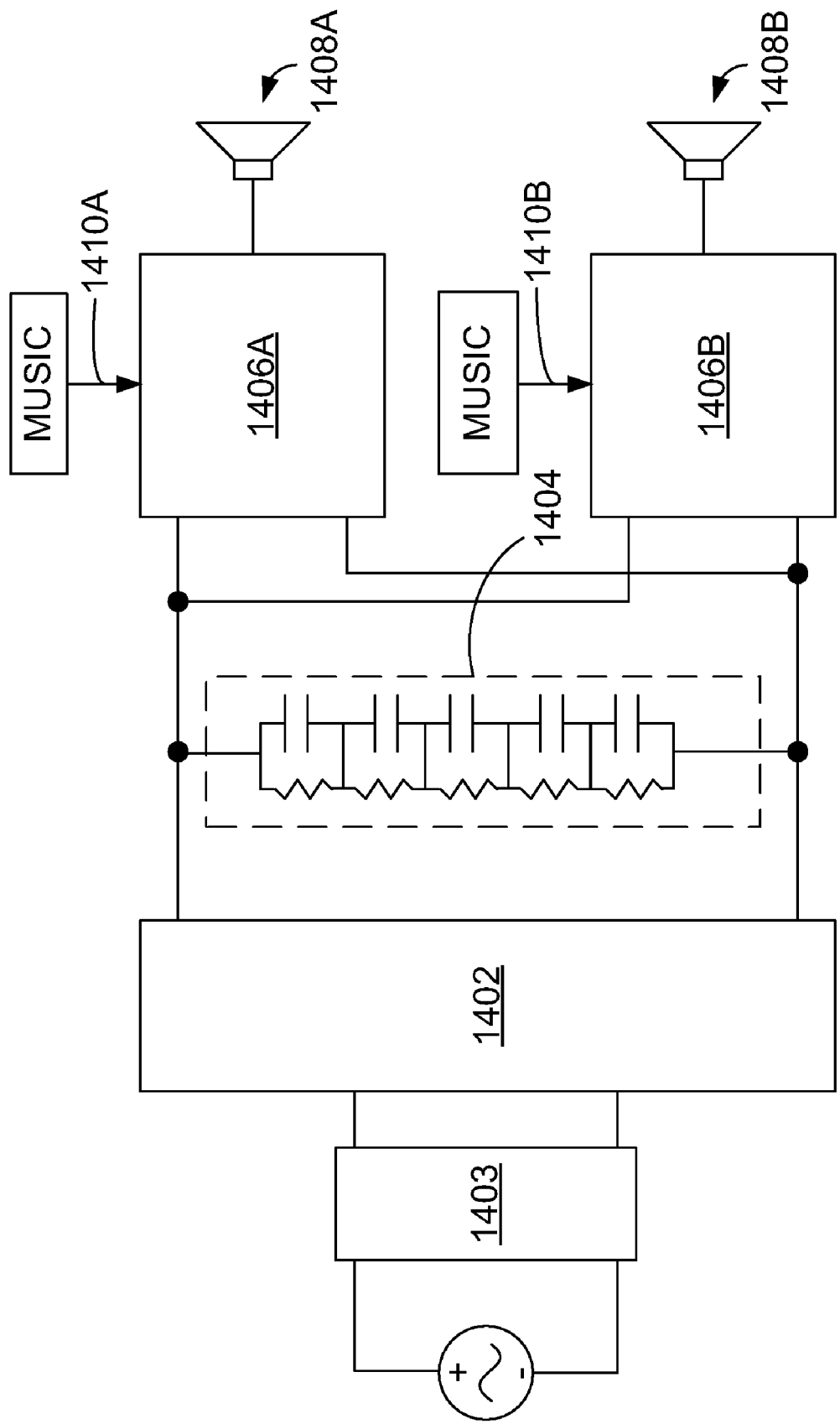

In another implementation shown in FIG. 14, a power supply 1402 (a DC-DC buck converter based on a Linear Technology model LTC1624 switching regulator controller) powered from an AC mains via an AC-DC converter 1403 (an Apple Computer 12 V/1 A wall pack) is connected in parallel with a capacitive element 1404 consisting of five 4 F/2.5 V aerogel super capacitors in series, each capacitor having a 20 kΩ shunt resistor, providing a total capacitance of 0.8 F and a maximum voltage of 12.5 V. The power supply 1402 and capacitive element 1404 power a pair of audio amplifiers 1406A and 1406B each driving a speaker 1408A and 1408B, respectively. Music signals 1410A and 1410B input into amplifiers 1406A and 1406B, respectively. When the power supply 1402 had an input current limit set to approximately 0.8 A and a nominal output voltage set to 12 V (for a maximum input power of 9.6 W), the power supply 1402 and capacitive element 1404 together provided a peak power of 25 W to the amplifiers 1406A and 1406B with the output voltage staying above the minimum operating voltage for all music tested.

Other embodiments are within the scope of the following claims.

What is claimed is:

1. A method comprising: in response to a change in a circuit parameter of a converter delivering power to an audio amplifier, operating the converter in a mode in which additional power is supplied to the audio amplifier by a capacitive element that is coupled with the converter, wherein the audio amplifier includes a compressor that has a threshold that is a function of a voltage to the audio amplifier by the capacitive element.

2. The method of claim 1, wherein a gain of the audio amplifier is a function of a voltage supplied to the audio amplifier by the converter.

3. The method of claim 2, wherein the audio amplifier is capable of operating without clipping over a range of values of the voltage.

4. The method of claim 2, wherein the gain of the audio amplifier is proportional to the voltage over at least a portion of a range of possible values of the voltage.

5. The method of claim 1, wherein the circuit parameter comprises at least one of output current, input current, input power, or temperature of a component of the converter.

6. The method of claim 1, wherein the converter acts as a voltage source in a first mode and as a current source in a second mode.

7. An apparatus comprising: a capacitive element; an audio amplifier; and a power converter, the capacitive element coupled to an output of the converter, such that in response to a change in a circuit parameter of the converter, the apparatus will operate in a mode in which additional power is supplied to the audio amplifier by the capacitive element, wherein the audio amplifier includes a compressor that has a threshold that is a function of a voltage supplied to the audio amplifier by the capacitive element.

8. The method of claim 1, wherein the capacitive element is coupled to output power terminals of the converter.

9. The method of claim 1, wherein the amplifier includes a compressor that has a threshold that is a function of a parameter indicative of an amplified signal level.

10. The method of claim 1, wherein the capacitive element is a super-capacitive element, and wherein the converter characteristics are chosen such that the voltage of the super-capacitive element discharges by at least about 20%.

11. The method of claim 1, wherein the capacitive element is a super-capacitive element, and wherein the converter characteristics are chosen such that the voltage of the super-capacitive element discharges by at least about 50%.

12. The method of claim 1, wherein the audio amplifier includes a variable gain circuit.

13. The apparatus of claim 7, wherein the audio amplifier is in parallel with the capacitive element.

14. The apparatus of claim 7, wherein the converter is in parallel with the capacitive element and the amplifier.

15. The apparatus of claim 7, wherein the gain of the amplifier is a function of a voltage supplied to the amplifier by the converter.

16. The apparatus of claim 7, wherein the capacitive element is a super-capacitive element, and wherein the converter characteristics are chosen such that the voltage of the super-capacitive capacitive element discharges by at least about 20%.

17. The apparatus of claim 7, wherein the capacitive element is a super-capacitive element, and wherein the converter characteristics are chosen such that the voltage of the super-capacitive element discharges by at least about 50%.

18. The apparatus of claim 7, wherein the audio amplifier includes a signal compressor that has a threshold that is a function of a voltage supplied to the audio amplifier by the converter.

19. The apparatus of claim 7, wherein the audio amplifier includes a variable gain circuit, a gain of the audio amplifier being a function of a voltage supplied to the audio amplifier by the converter.

20. An apparatus comprising:
an audio amplifier;
a capacitive element arranged to provide power to the audio amplifier; and
a converter arranged to provide power to the capacitive element and the audio amplifier;
the converter allowing a deep discharge of at least about 20% of the capacitive element,
wherein a time constant of the capacitive element discharge is at least about 1 second.

21. The apparatus of claim 20, wherein the converter is configured by one or more of: (a) limiting output power of the converter in response to a circuit parameter, (b) limiting output current of the converter in response to a circuit parameter, (c) limiting input power of the converter in response to a circuit parameter (d) limiting input current of the converter in response to a circuit parameter, and (e) increasing output impedance of the converter in response to a circuit parameter.

22. An apparatus, comprising:
an audio amplifier;
a capacitive element arranged to provide power to the audio amplifier; and
a converter arranged to provide power to the capacitive element and the audio amplifier, the converter allowing a discharge of the capacitive element, wherein a time constant of the capacitive element discharge is at least about 1 second, wherein the converter is configured by changing the output voltage-current characteristic in response to reaching a threshold of a circuit parameter selected from at least one of a group consisting of output current, output power, input power, input current and temperature.

23. The apparatus of claim 21, wherein power limiting is accomplished by adjusting a circuit parameter selected from at least one of a group of parameters consisting of output current, output power, input power, input current, output voltage and output impedance.

24. The apparatus of claim 20, wherein converter characteristics are chosen such that the voltage of the capacitive element discharges by at least about 50%.

25. An apparatus, comprising:
an audio amplifier;
a capacitive element arranged to provide power to the audio amplifier; and
a converter arranged to provide power to the capacitive element and the audio amplifier, the converter allowing a discharge of the capacitive element, wherein a time constant of the capacitive element discharge is at least about 1 second, wherein the audio amplifier includes a variable gain circuit, the gain of the audio amplifier being a function of a voltage supplied to the audio amplifier by the converter.

26. The apparatus of claim 20, wherein the time constant is at least about 5.5 seconds.

27. The apparatus of claim 20, wherein the capacitive element is a super-capacitive element.

28. The apparatus of claim 20, wherein a reduction or converter peak power demand is at least about four times.

29. The apparatus of claim 20, wherein the time constant is at least about 5.5 seconds.

30. The apparatus of claim 20, wherein the capacitive element is a super-capacitive element.

31. The apparatus of claim 20, wherein a reduction of converter peak power demand is at least about four times.

* * * * *